(12) United States Patent
Muldoon et al.

(10) Patent No.: US 7,233,992 B1
(45) Date of Patent: Jun. 19, 2007

(54) COMPUTERIZED METHOD AND SYSTEM FOR MANAGING THE EXCHANGE AND DISTRIBUTION OF CONFIDENTIAL DOCUMENTS

(75) Inventors: John M. Muldoon, Belle Mead, NJ (US); Mark S. Adams, New York, NY (US); Leonard G. Goldstein, Cos Cob, CT (US); Craig Markovitz, New York, NY (US); Patrick J. Wack, Jr., New York, NY (US)

(73) Assignee: Comerica Bank-California, San Jose, CA (US)

( * ) Notice: Subject to any disclaimer, the term of this patent is extended or adjusted under 35 U.S.C. 154(b) by 0 days.

(21) Appl. No.: 09/483,171

(22) Filed: Jan. 14, 2000

Related U.S. Application Data

(60) Provisional application No. 60/131,036, filed on Apr. 26, 1999.

(51) Int. Cl.
*G06F 15/173* (2006.01)
(52) U.S. Cl. .......................... 709/226; 709/223; 705/6
(58) Field of Classification Search ................ 709/206, 709/226, 223; 705/6, 5; 707/10
See application file for complete search history.

(56) References Cited

U.S. PATENT DOCUMENTS 5,815,665 A * 9/1998 Teper et al. ................. 709/229
5,961,590 A * 10/1999 Mendez et al. ............. 709/206
6,029,146 A * 2/2000 Hawkins et al. .............. 705/35
6,385,655 B1 * 5/2002 Smith et al. ................ 709/232
6,442,571 B1 * 8/2002 Haff et al. .................. 707/201

* cited by examiner

*Primary Examiner*—Jason Cardone
*Assistant Examiner*—Adnan M. Mirza
(74) *Attorney, Agent, or Firm*—Greenberg Traurig, LLP

(57) ABSTRACT

A method and system for sending, receiving and managing the exchange of messages between an intranet and multiple external users using a secure server as an intermediary interface for Internet communications. In one form, the secure server operates in a replication mode with a Lotus Domino server wherein secure transmissions are designated by an @secure URL. In another form, secure transmissions are implemented by establishing a secure connection to the secure server using a browser addressing the server URL. The server operating system interfaces with the intranet so that the intranet user can use standard groupware, such as Lotus Notes, to create, send and receive secure documents. External users are notified by normal e-mail of the presence of secure documents at the server and must connect to the server in a secure mode to retrieve documents. Responses to documents are automatically returned to the sender's e-mail server using secure transmission.

47 Claims, 33 Drawing Sheets

Response to Package http://127.0.0.1/expressdemo/express.nsf/WebCreateReply?openform&parentUNID=0...

Send To    John Rockeffeler/GlobalBank

Title      ☑ R: Prospectus      Required Field

Description   Count me in! Thanks

Attach file   [ Browse ]

Click here to download the MSIE plug in to attach files

[ Send ]  [ Cancel ]

New Person – Lotus Notes

File  Edit  View  Create  Actions  Text  Window  Help

Close  Save User

User
Activation Information:

Status:           Request

User Name:        Bill Conklin/Lawfirm
User Role:        Sender
Email Address:    bconklin@lawfirm.com Address Information:

First Name:                    Last Name:
Middle Initial:                Billing Code:
Job Title:                     Department:
Address1:                      Address2:

REQUIRED FIELD: Please enter an Email Address

Start    express demo    9:19 AM

FIG. 27

IntraLinks Demo - Administration\System Activity - Lotus Notes

File  Edit  View  Create  Actions  Window  Help admin / groups / users

| User Name | First Log On | Last Log On |
|---|---|---|
| Receiver | | |
| Jim Rudy/Lawfirm | 11/19/99 2:34:18 PM | 11/19/99 2:42:05 PM |
| Sender | | |
| Brook Barnes/Investor7 | 11/18/99 9:19:33 PM | 11/18/99 9:19:33 PM |
| Jim Priclo/Chase | 11/18/99 10:59:34 PM | 12/1/99 11:37:41 PM |
| John Rockefeller/GlobalBank | 11/18/99 7:25:40 PM | 12/21/99 12:10:10 PM |
| Peter Laffey/Investor2 | 11/18/99 8:32:43 PM | 12/1/99 11:34:23 PM |
| Rich Jenkins/Investor | 11/17/99 6:28:59 PM | 12/22/99 9:06:41 PM |

- activation log
- activation requests
- assign recipients
- system activity
- all documents
- log errors
- service document express demo

FIG.33

COMPUTERIZED METHOD AND SYSTEM FOR MANAGING THE EXCHANGE AND DISTRIBUTION OF CONFIDENTIAL DOCUMENTS

SPECIFIC DATA RELATED TO INVENTION

This application claims the benefit of the filing date of provisional patent application, U.S. Ser. No. 60/131,036, filed Apr. 26, 1999.

BACKGROUND OF THE INVENTION

The present invention concerns generally a process and system for enabling electronic transmission and reception of confidential documents over a global communication network such as the Internet and more particularly to a method and system for distributing electronic documents containing sensitive information or data to selected entities, to a method and system for notifying intended recipients of the availability of such documents and to a method and system for tracking access, downloading and uploading of such documents.

People and businesses have become aware of the communication potential of the "Internet", sometimes referred to as a "global communications network", a digital communications network which enables a connection between computers worldwide. Unfortunately, security on the Internet remains imperfect, particularly since one of the Internet's design goals—an ability to route communications around damage to any node—makes it difficult to know or control the path by which any particular message will travel to reach its intended recipient, and who else will have access to it along the way. Even supposedly secure transmissions of data such as credit card information has been intercepted by "hackers".

Network software known as "groupware," such as "Lotus Notes," running on a computer network within a company (a "private network" or "intranet"), permits individuals who have access to that particular network to work together efficiently by sharing documents, and editorial revisions to shared documents such as document updates, "redlined" revised drafts, and comments, as well as e-mail to create conference room collegiality and efficiency among employees actually separated in time and/or space without the security risks associated with the global network or Internet. However, there is still no entirely satisfactory way for people at different companies or other entities to have the benefits of private network security, particularly for ad hoc alliances, i.e., different sets of entities coming together to function as one mega or meta entity, for the duration of some particular project. In such a case, the time and expense of actually wiring a network between two or more companies or other entities and agreeing on one common software package or standard presents a barrier to conventional network solutions. Simply using the Internet remains imperfectly secure for transmission of confidential information without some pre-arranged encryption and present methods for pre-arranging secure encryption processes have been cumbersome and unproductive. Thus, there is a yet-unsolved problem of permitting different groups of companies or other entities to communicate securely over a global network for different projects, to quickly and inexpensively obtain the benefits of secure groupware in connection with each project, and to be able to add and drop entities without difficulty with respect to any particular project. For example, in the banking industry, ad hoc syndicates are formed under the leadership of one or more lead banks to permit a number of agent or associate banks to participate in a major loan to a borrower. Such loans have become more common and may involve loans in excess of one billion dollars. Syndication of such large loans is used since any one bank is not prepared to lend such a large amount to a single customer. Conventionally, proposed terms of a loan are negotiated between the borrower and the lead banks, each in consultation with its advisors such as legal counsel, public-relations consultants, accountants and insurance carriers. In some instances, some advisors may be in-house advisors as employees of a given entity and thus constitute an internal team. However, the advisors in many instances may be independently associated with external entities such as law firms or major accounting firms and thus constitute either external teams or combinations of the above. The lead bank(s) negotiates with the borrower to arrive at terms and conditions for the loan, such as the interest rate, repayment schedule, security and the bank's fee for processing and syndicating the loan. The lead bank may agree to underwrite the entire loan in which case the lead bank uses syndication to create sub-loans between it and other banks to raise the funds for the loan. All of these transactions require management of voluminous amounts of documentation, most of which is confidential and whose disclosure could result in huge damages to the borrower or lenders. Thus, it would be desirable to provide a system which enables secure document transmission between users over a global communication network without requiring the users to communicate in advance to establish an encryption method.

SUMMARY OF THE INVENTION

In general, the present invention provides a method and apparatus for enabling secure transmission of documents between multiple senders and receivers. More particularly, the invention includes a secure data storage facility and a computer program operable at such facility for enabling reception, storage and transmission of securely encrypted documents with access to the documents being enabled through a global computer network using conventional network browser software having encryption capability or from a private network or intranet. For example, Microsoft Corporation Internet Explorer 4.0 having 128 bit encryption capability can be used to access the data storage facility. Any receiver can download a document to which he/she has access, make modifications as desired using conventional word processors and upload modified documents with comments to the storage facility using encrypted transmissions. Further, the invention includes active notification to intended document recipients of the presence of a document at the secure storage facility for their review. The present invention also provides for integrating an intranet server to a secure server at the storage facility such that a user can utilize an ordinary e-mail program to send and receive documents. For example, a Lotus Notes user can use Lotus Notes to send documents outside his intranet in essentially the same manner as used for sending documents within the intranet.

Software resident at the secure server automatically issues respective notification messages from the server to the selected receiver computers, each respective one of the notification messages indicating that documents are available in the server for their respective retrieval over the network. The selected receiver computers can access and retrieve documents resident at the server. During the access process, the server interfaces with the receiving computer to establish a secure data transmission process. Preferably, the communication process uses 128 bit encryption but can default to a lower encryption.

The present invention further fulfills the foregoing needs by providing a computer communication system for notifying a plurality of receiving computers generally operated by unrelated business organizations of receipt by a predetermined host server of respective electronic documents from a sender computer. The respective documents may be retrieved by each respective receiving computer over a global communications network. The sender computer and the receiving computers are registered in the host server and are interconnectable to the host server through the global communications network (the "Internet"). The computer communication system may include software code or modules that allow for selecting one or more of the plurality of receiver computers to which the respective documents to be retrieved over the global communications network are addressed. A notification module allows for issuing a respective notification message from the predetermined server to the selected receiver computers. Each respective notification message indicates that documents are available for their respective retrieval over the global communications network. A retrieving module allows for retrieving the documents by the selected receiver computers over the global communications network upon a respective user of the selected receiver computers issuing a respective download command signal to the server.

BRIEF DESCRIPTION OF THE DRAWINGS

FIGS. 3-33 are computer screen images showing operation and features of the invention.

DETAILED DESCRIPTION OF THE INVENTION

Figure 1:
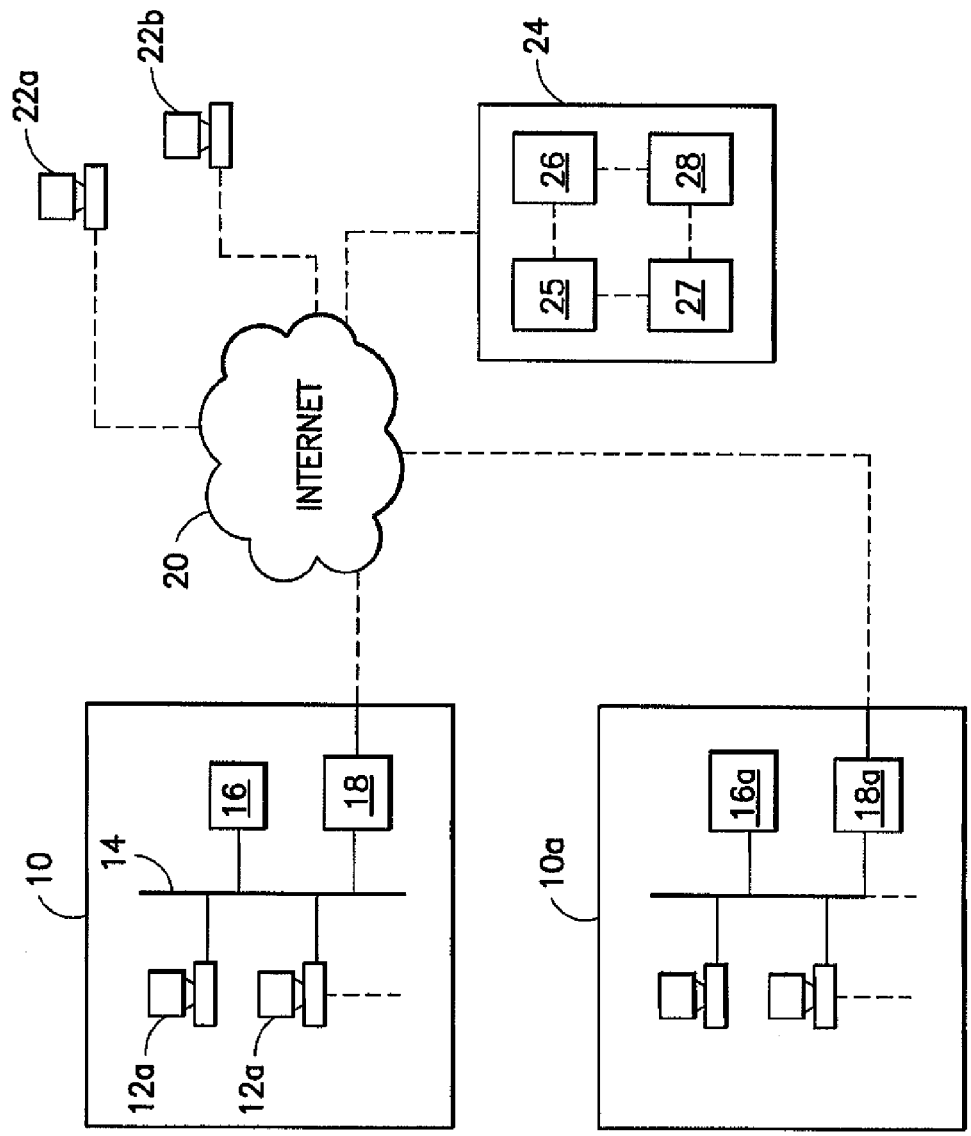
FIG. 1 is a block diagram showing one exemplary embodiment of a communication system in accordance with the present invention.

As suggested above, the present invention can be used for many types of communications between different parties that are associating for a temporary transaction or project, but as competitors or for other reasons are not suitable for a permanent communication network (an intranet such as a LAN or WAN) as might be used for a single government agency or single corporation. Projects involving financial or legal transactions are particularly suitable, although not necessarily the only sort of project appropriate, for the method of the instant invention. Additionally, the present invention enables an intranet user to transmit/receive documents using an e-mail server to/from a computer connected to the Internet, i.e., the system provides an intranet e-mail to Internet browser interface. Electronic mail (e-mail) systems for sending messages and documents between computers connected to the Internet or to an intranet are well known. Typically, within an intranet, e-mail is sent to an e-mail server which interfaces with an Internet server to allow e-mail to be sent outside the intranet. FIG. 1 illustrates in block 10 a simple intranet arrangement such as might be used in a Lotus Notes system. Intranet users 12a, 12b represent Lotus Notes clients connected via cable 14 to an e-mail server 16 and an Internet server 18, such as a Lotus Domino server. While servers 16, 18 could be integrated, separation is desirable in order to create a firewall between the outside world (the Internet) and the inside world (the intranet). The Domino server 18 connects to the Internet 20 using conventional protocols which allow it to send and receive messages from remote computers 22a, 22b and from other servers 24.

In the present invention, the server 24 is a secure server which can only be accessed by authorized computers using an acceptable log-in procedure, including user name and password. Server 24 is integrated or tightly coupled to the Domino server 18 so that a secure message from server 18 is replicated in server 24 using Lotus Domino protocols. Similarly, any message being sent via server 24 to server 18 is replicated in server 18. However, when server 18 and server 24 communicate with each other, software operating at server 24 establishes a communication session based upon a selected security protocol, such as, for example, 128 bit encryption of the type currently available using commercial browser software such as Internet Explorer or Netscape. Thereafter, the messages are transmitted between servers 18 and 24 using such secure encryption.

Whenever a message is received at server 24, the server 24 extracts the e-mail address of the intended recipient and creates an e-mail notification to the recipient of the existence of the message at the server 24. The e-mail notification contains the URL for server 24. However, the recipient cannot access the message unless the recipient is authorized to use the system, i.e., the recipient must be a registered user and have an assigned password to access the message, or the "mailbox" or other repository at the server 24 where messages are stored. If the intended recipient is granted access to the server 24, the recipient can then locate the message intended for him/her by browsing through all messages to which the recipient has been granted access.

While the e-mail notification is sent to the intended recipient such as computer 22a using standard Internet protocol without encryption, once the computer 22a contacts server 24, the server establishes a secure encrypted communication session using a selected encryption protocol. The server 24 may deny access if a secure session cannot be established at a desired secure level, such as 128 bit encryption.

As described above, the users 12a, 12b operating in their own intranet simply use their internal e-mail programs in a conventional fashion to send confidential messages/documents over a secure connection. If the e-mail system can be used to send Internet messages that do not go through the secure server 24 and, for that reason, messages to be sent via secure server 24 may be designated as secure by adding a designator, such as @ secure, to the Internet address or URL. From an external source such as users 22a, 22b, secure messages can be transmitted to intranet 10 via secure server 24 using a similar type of addressing, i.e., by adding an @ secure to the recipient's (user 12a, 12b, etc.) URL.

Another feature of the present invention is the ability to group mail services for different clients into separate software structured server databases. For example, if intranet 10 represents company A, intranet 10a may represent company B. Each company uses the same secure server 24 but each company's e-mail is maintained in separate grouped files although perhaps in the same hard drive storage media. This feature offers the advantage of allowing server 24 to be customized for each company. For example, when the external user accesses server 24, the server can recognize the user and associate the user with a particular one of the companies A and B. Using this recognition, the server 24 can present a customized browser interface which makes the server 24 look like the selected company. To the external user, it thus appears that he/she has been connected directly to the company server 18 rather than the server 24. This feature is exemplified by database blocks 25, 26, 27 and 28 in server 24.

Systems for electronic document delivery are known in the art as shown by U.S. Pat. No. 5,790,790 issued Aug. 4, 1998, which patent also discloses sending of e-mail notification of the presence of a document at a server. However, it is not believed that the prior art discloses a tightly coupled relationship as described above with regard to the use of the Lotus Domino server 18, a feature which allows an e-mail user to send documents using a conventional intranet e-mail program such that the Internet connection is substantially transparent to the e-mail user. Further, it is not believed that prior art systems provide customization of a remote server for each of a plurality of different users such that an external user accessing the remote server appears to be connected to an internal client server.

Figure 2:
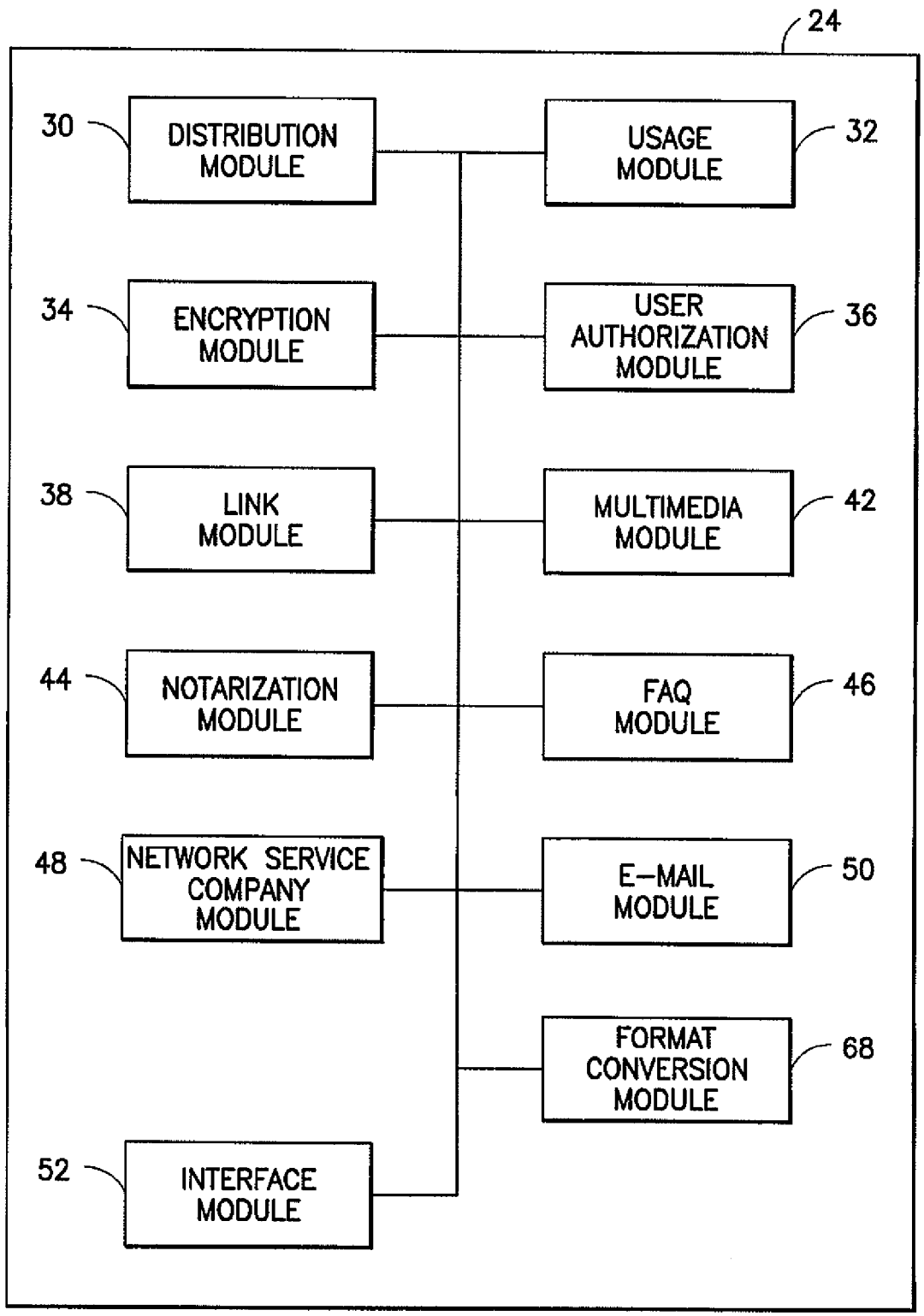
FIG. 2 is a block diagram showing exemplary operational modules of a host server that may be used by the communication system shown in FIG. 1.

FIG. 2 shows further details in connection with the server software which may be readily incorporated in host server 24. For example, a distribution module 30 allows host server 24 to electronically distribute messages and documents using secure communications among the users. A usage module 32 allows host server 24 to monitor the usage of the network to permit the users to be billed for the network service. Server 24 can set up and manage a plurality of separate virtual networks concurrently, with each such virtual network representing a different intranet client such as company A and company B.

Host server 24 can offer a high level of security for all documents and information by employing substantially secure Internet connections, and by means of security and encryption technologies developed for intranets such as may be readily incorporated in an encryption module 34. Additionally, host server 24 provides highly secure access control by way of a user authorization module 36 which allows only authorized personnel to access individual messages and related documents and communications.

Host server 24 can give each client user 10, 10a the ability to electronically link or be interconnected via link module 38 with any number of other users. Although documents may be preferably formatted in a Portable Document Format (PDF), such as may be readily implemented with a commercially available document exchange programs such as an Adobe Acrobat program and the like, other formats could be optionally accommodated using a suitable format conversion module 40. A multimedia module 42 may also be used to process any data into a format suitable for presentation to the user in forms other than text such as audio, still or moving images, and the like. Further, a notarization module 44 may be provided to electronically certify any electronic document forwarded to the users. Notarization module 44 may incorporate electronic signature technology owned and developed by Bell Labs and made commercially available through their sales organization. Frequently Asked Questions (FAQs) or HELP module 46, may conveniently allow authorized users to electronically create, post, and edit an electronic board containing FAQs. A network service company module 48 may conveniently be used to display various data in connection with the network service company such as additional services that may be available by the network service company to the users. The above modules work jointly with e-mail module 50 and interface module 52 to send e-mail notices of messages and interface with users through either an e-mail server or an Internet browser to securely pass documents.

It will be appreciated that the external users such as 22a, 22b may conveniently use commercially available Internet software browser utilities such as the "Netscape Navigator" or "Microsoft Internet Explorer" to access messages and documents at server 24 since the server is presently designed for compatibility with such Internet browsers. Server 24 includes a plug-in and secure socket layer ("SSL") for additional security.

As will be appreciated by those skilled in the art, the browser software and plug ins in the external user computers may conveniently provide the following functions:

Access

Access to the host server 24 site through the subscribers existing Internet connection and Internet browser software, or through a suitable client software, such as "Lotus Notes" client software;

Automated response to security and password inquiries;

Activation

Prompt the user to enter a password and any other input required for verification, such as a digital signature or key encryption codes;

Automatically send the password and other information to the host server site;

Log the user into the host server site and the relevant authorized databases once verification of the password is successfully completed;

Security

Provide access security for both "Notes" and Internet browser clients using advanced security procedures;

Provide transmission security for both "Notes" and Internet browser clients including encryption/decoding of transmitted files;

Require frequent subscription renewal to restrict subscriber access to short intervals such as monthly intervals;

Viewing

For Internet browser clients, permit viewing of Standard Generalized Markup Language (SGML) pages, such as Hyper Text Markup Language (HTML) pages and play back of multimedia elements;

For "Notes" groupware clients, permit viewing of "Notes" pages and play back of multimedia elements;

Permit viewing of coded, multimedia information by authorized users only;

Permit viewing of related documents and files of e-mail Messages and attachments, and v-mail communications by authorized users only;

Communications

Transmit and receive e-mail;

Receive and play back video-mail communications;

A wide range of communication-link services and options are presently available to businesses. Many of these services are available almost ubiquitously throughout the United States. The communication link services generally vary in cost depending on bandwidth, distance between nodes, traffic, and other factors. Some common types of communication links today are:

modem, with a maximum bandwidth of 56.6 Kbps or so,

Integrated Services Digital Network (ISDN), with maximum bandwidths of 64 Kbps and 128 Kbps, T-1, with a maximum bandwidth of 1.544 Mbps or so, Cable Modem, with a maximum bandwidth exceeding 30 Mbps.

Future improvements in high speeds communication links and modems can be expected to further improve performance of the present invention.

ISDN and T-1 connections are substantially dedicated communication links and would enable the server 24 to link directly to company intranets 10, 10*a*. On the other hand, dial-up communications utilizing the public switched telephone network (PSTN) is available although the communications speed over the public switched telephone network is slow relative to the ISDN and T-1 connections, especially for multimedia information. There are other high-bandwidth links available as well from a variety of carriers and Internet access providers.

Figure 3:
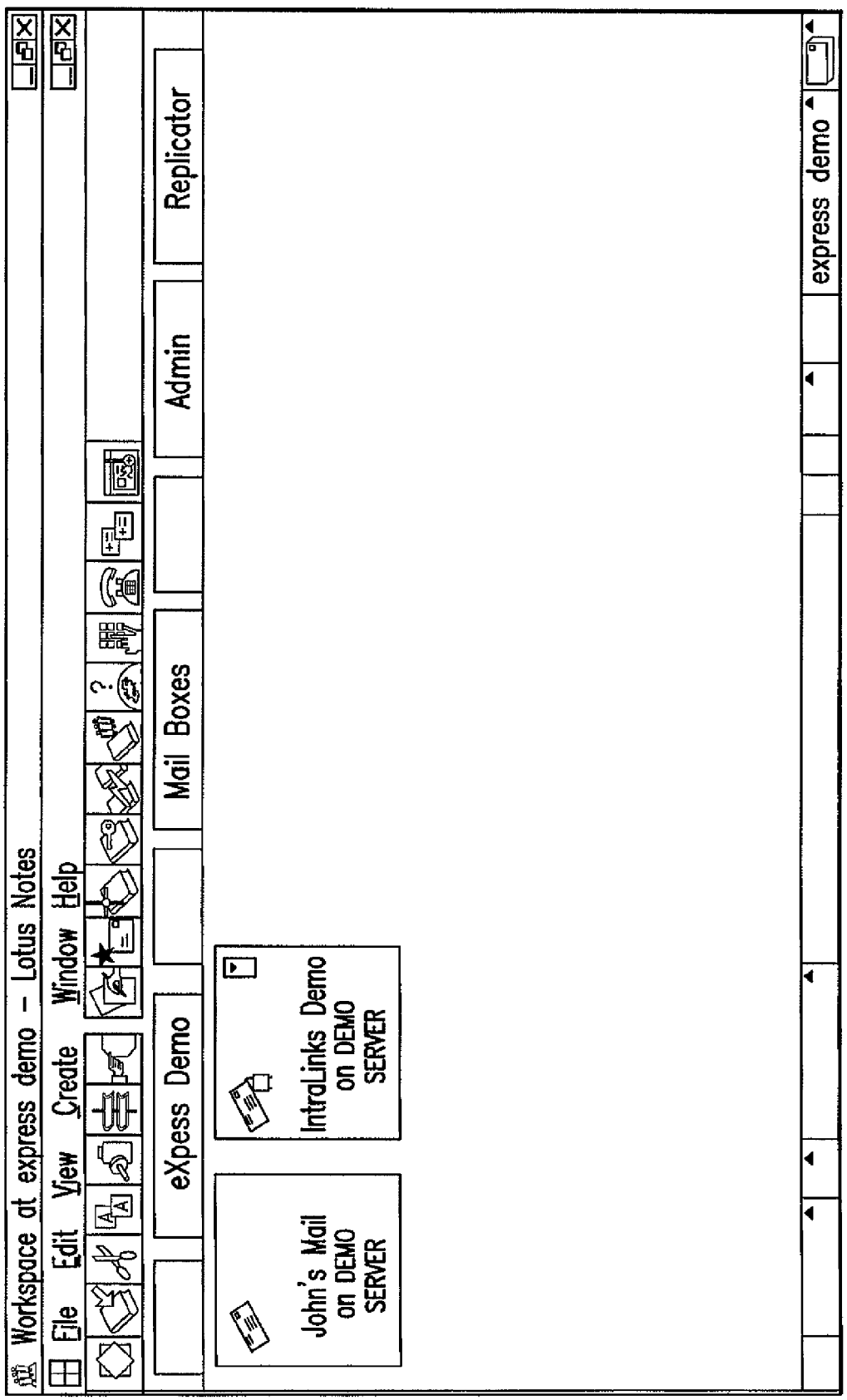
Figure 4:
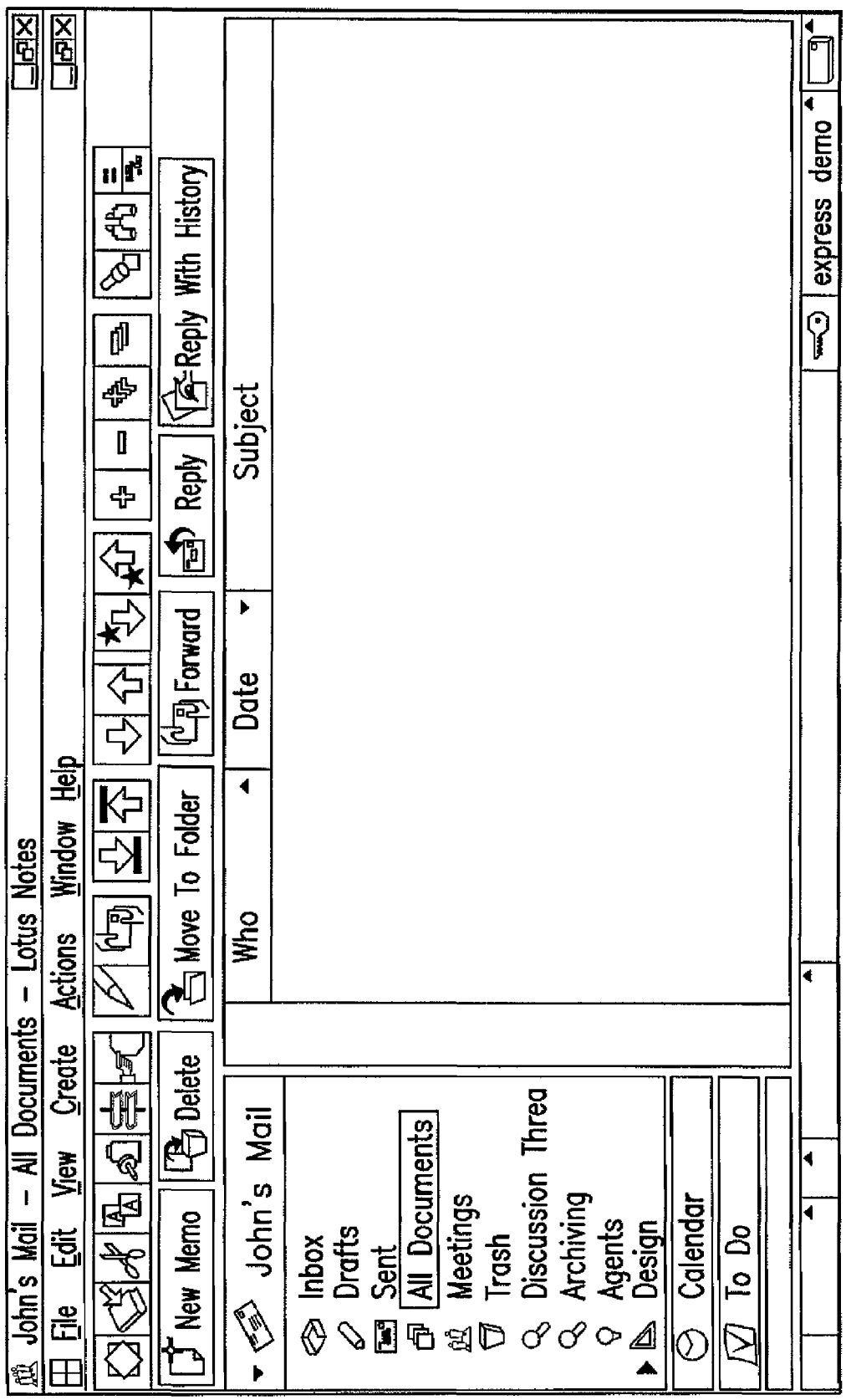
Figure 5:
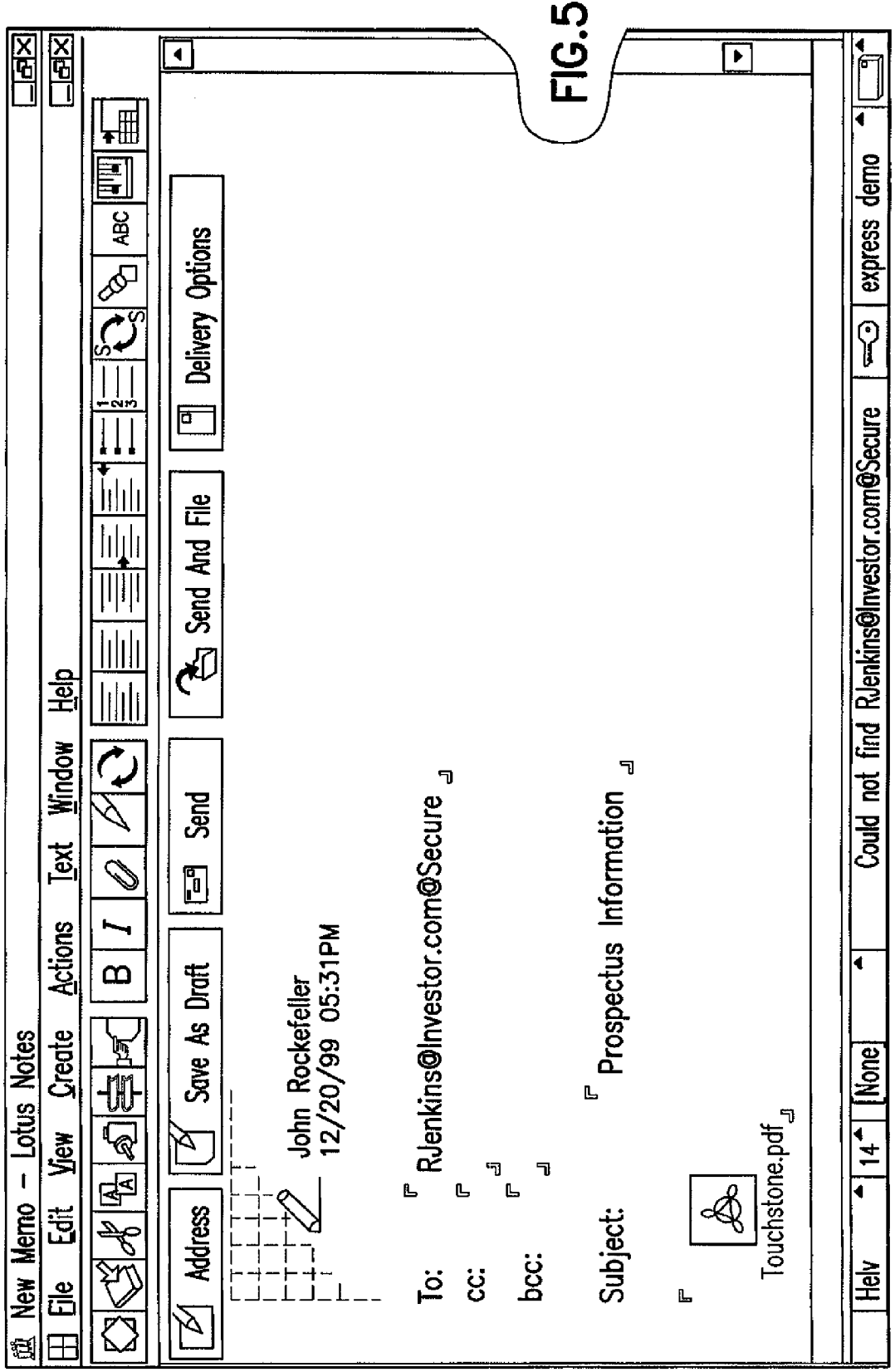

FIGS. 3-33 shows a sequence of computer screens illustrating operation of the invention from a user computer. It will be seen from the screen shots that the company user views a workspace in a Lotus Notes environment although the system is implemented similarly for interfacing with a Microsoft Outlook e-mail system. FIGS. 3 and 4 show standard opening screens for Lotus Notes in which the invention has been added. For purposes of description, the inventive system is referred to as e-Xpress. On FIG. 3, the user clicks the mail button which opens FIG. 4 from which the user selects what is desired to be viewed. FIG. 5 illustrates creation of an e-mail with attachment.

The normal CC and BCC work the same as any other e-mail. Group names can be entered and all the standard e-mail things normally done. The only real difference in routing is making sure that any recipients that need to receive the message/attachments securely have @ security at the end of their Internet address. You might do this the same way for Microsoft exchange or other e-mail systems. This approach is one approach and this requires no customization to the client workstation. There are other approaches that could be used in an e-mail scenario where the mail template at FIG. 5 could be changed such that you might have a confidential check box or you might have a check box that says secure, or you might have a button or something that would tell you that this document is going to be different, and by hitting that button or checking off that check box, it will tell that mail environment to route this particular mail message through the interlink service.

Figure 6:
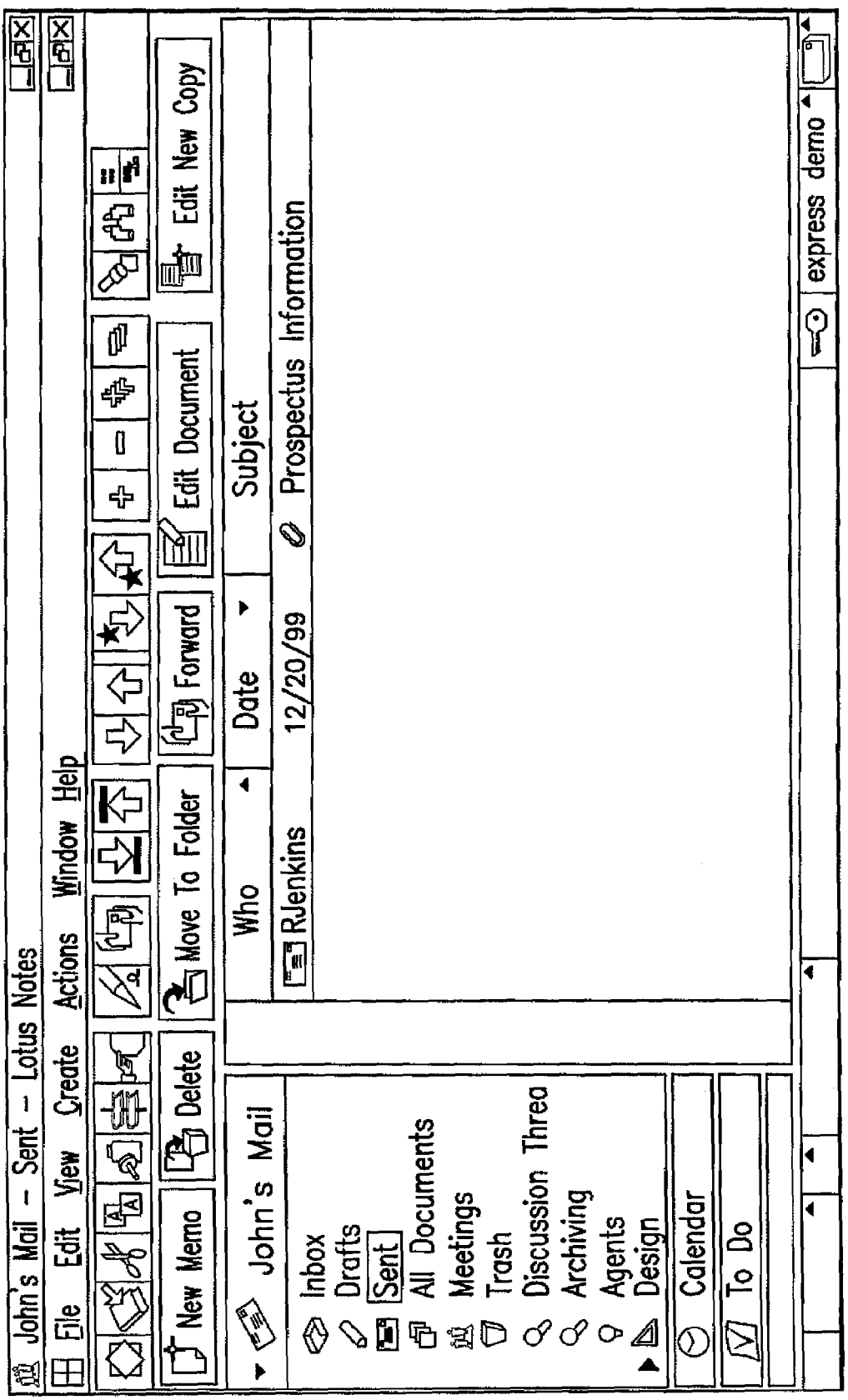
Figure 7:
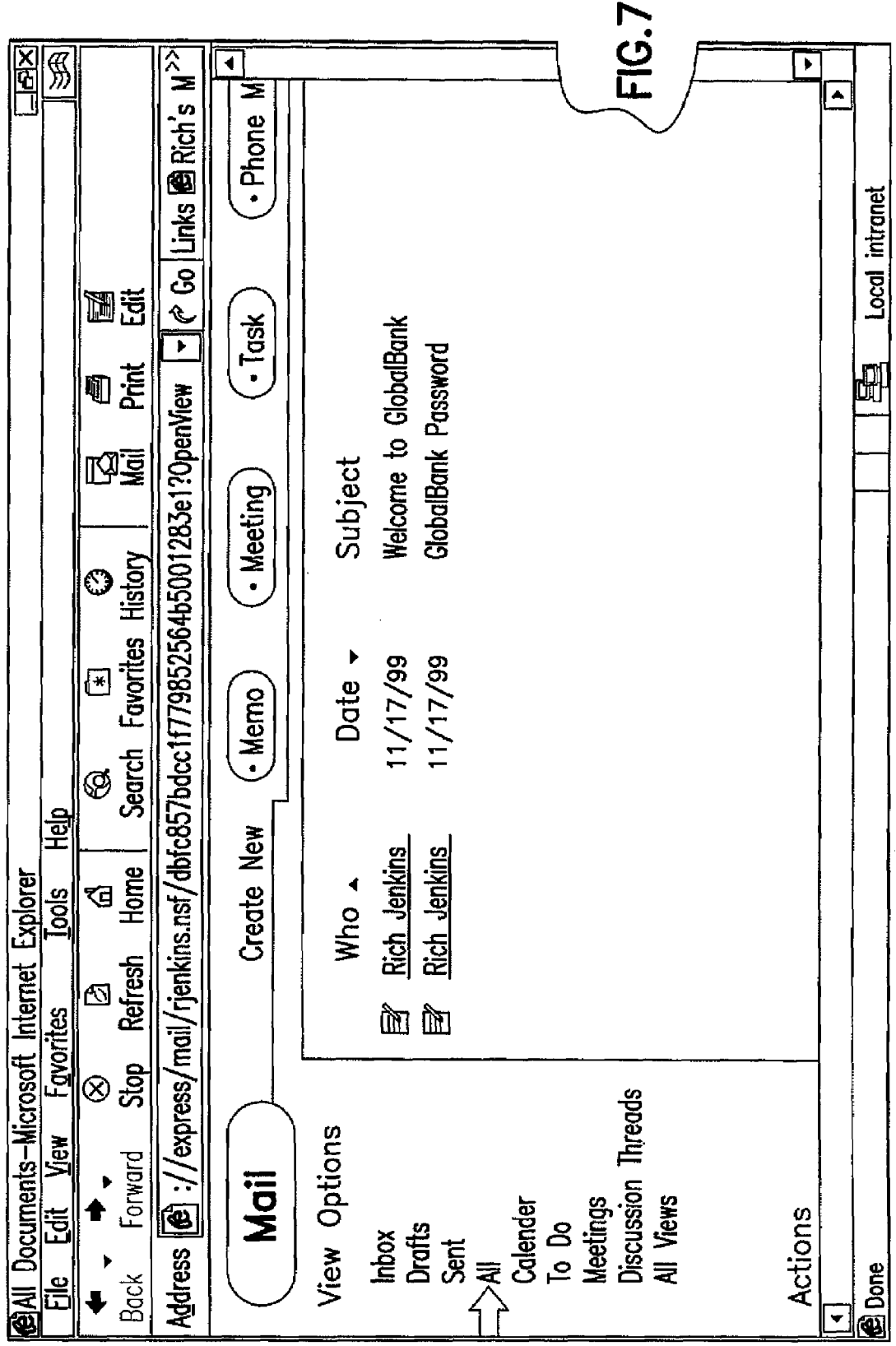
Figure 8:
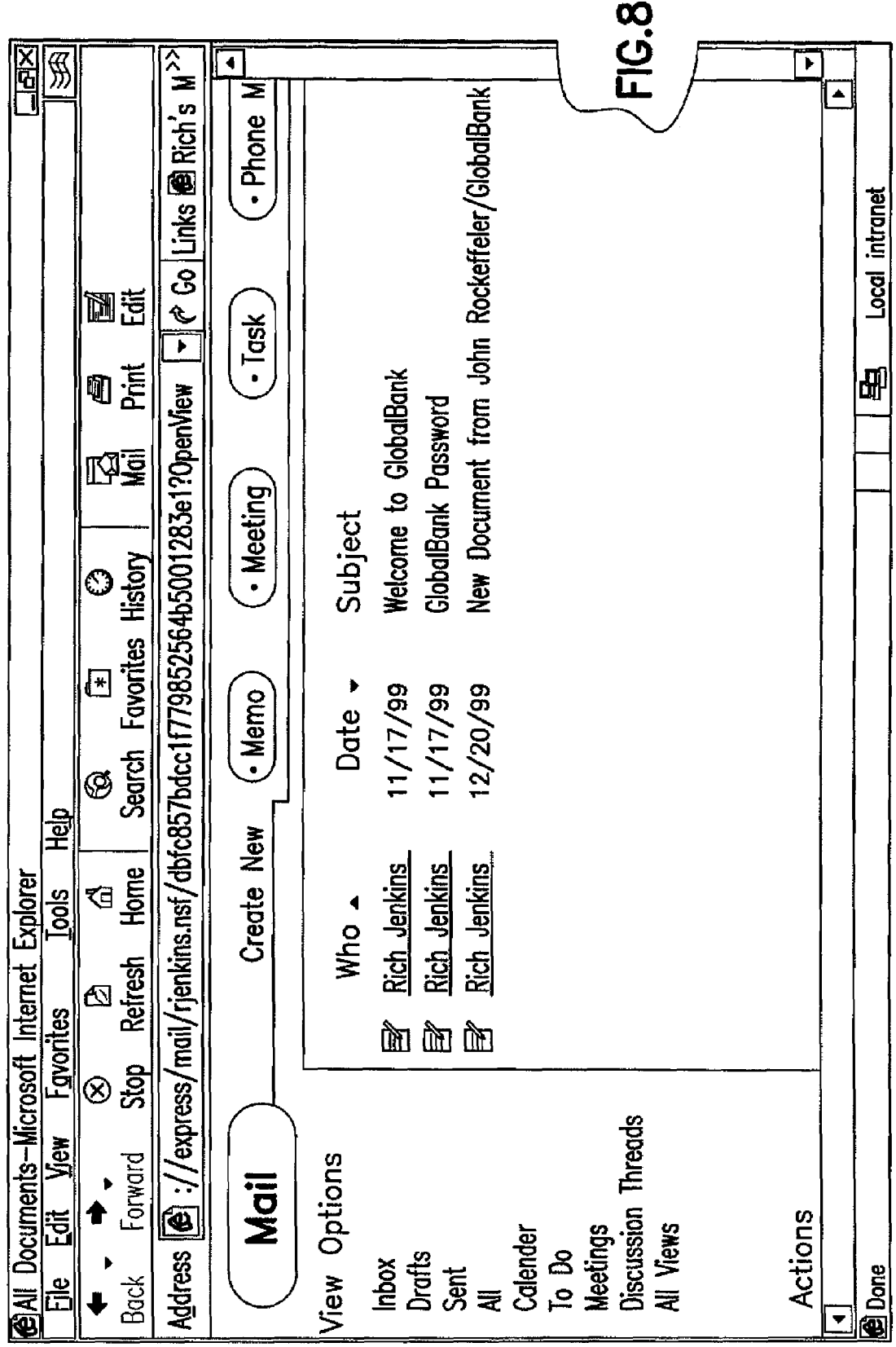
Figure 9:
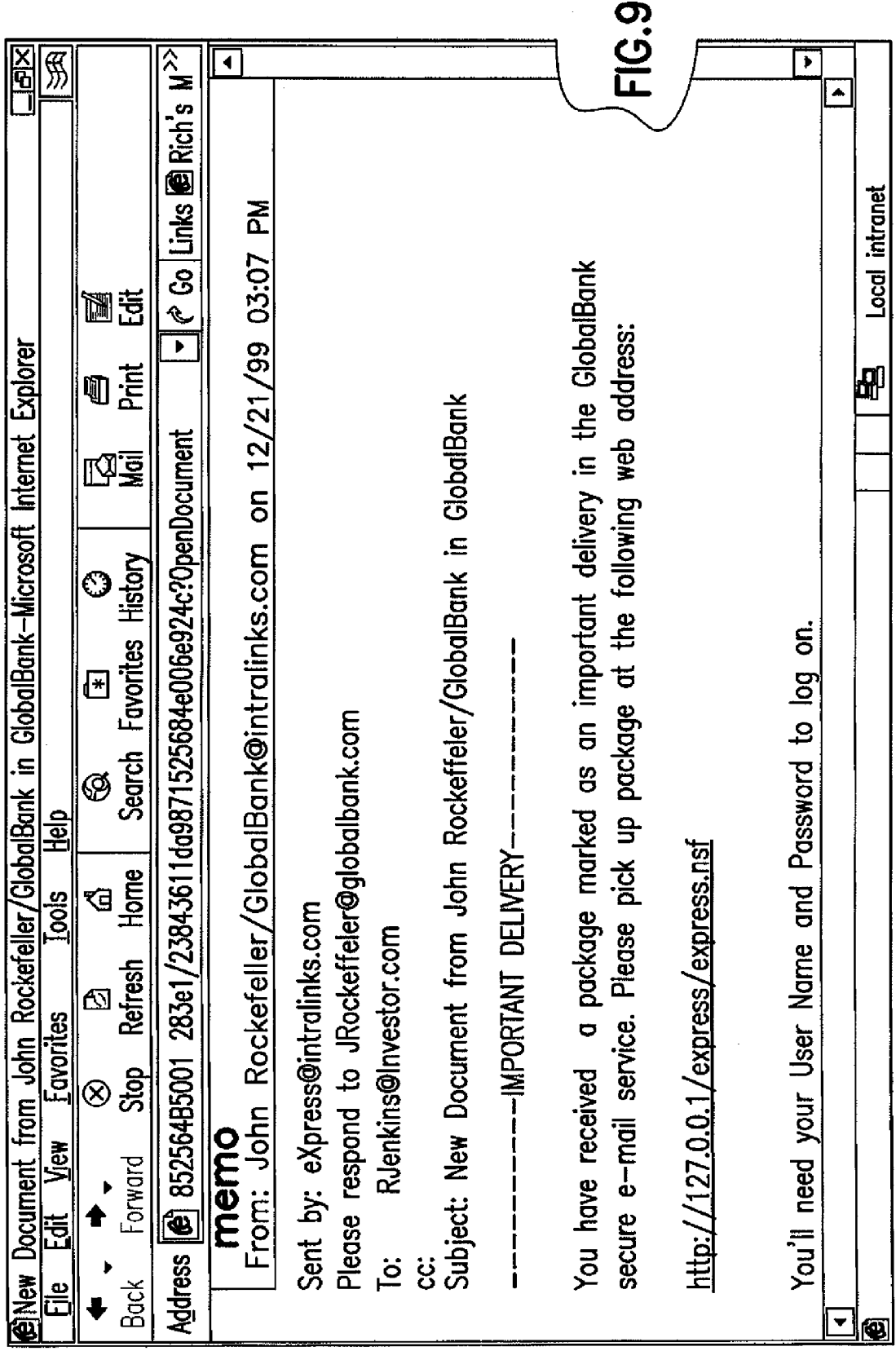
Figure 10:
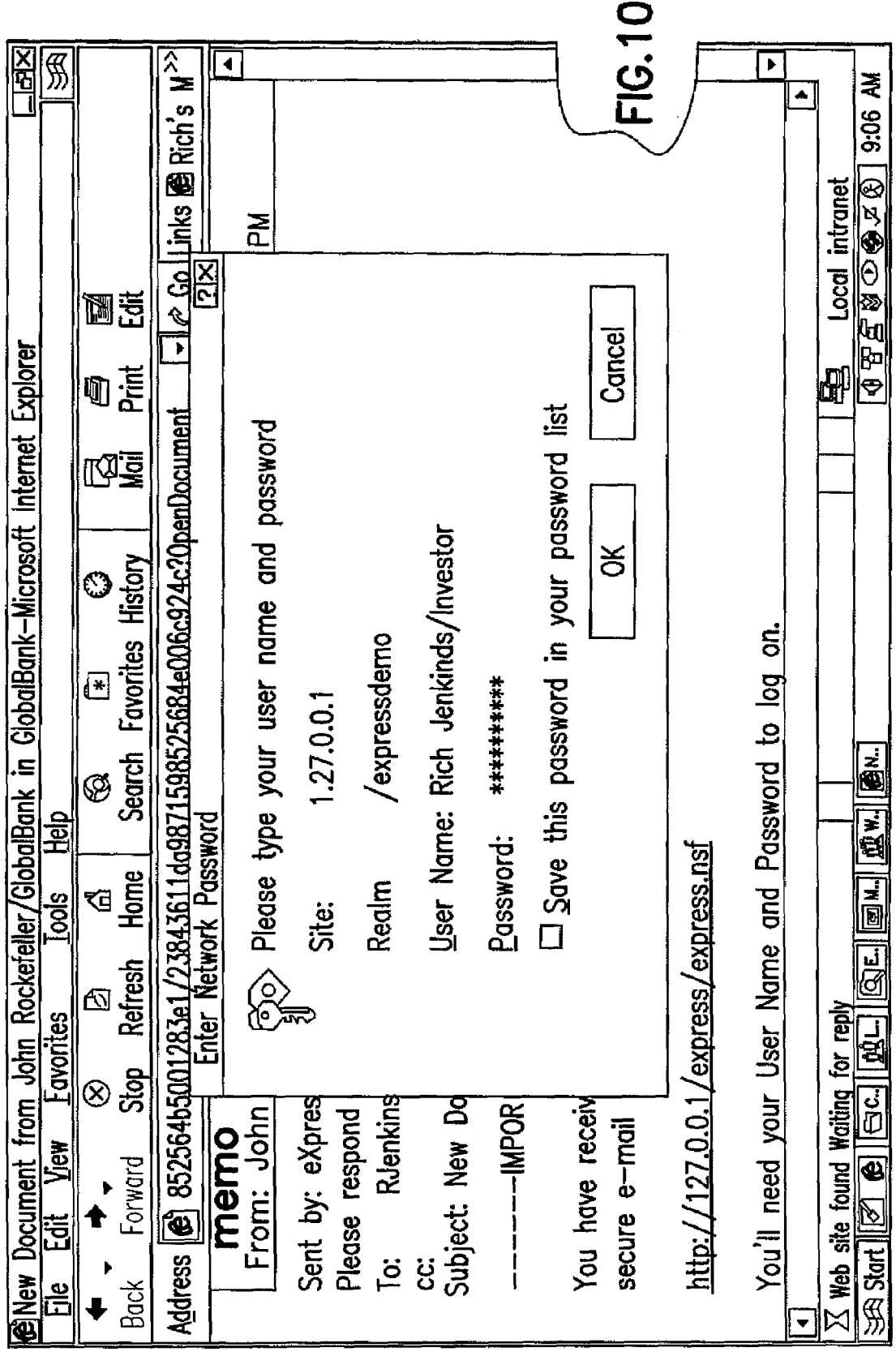
Figure 11:
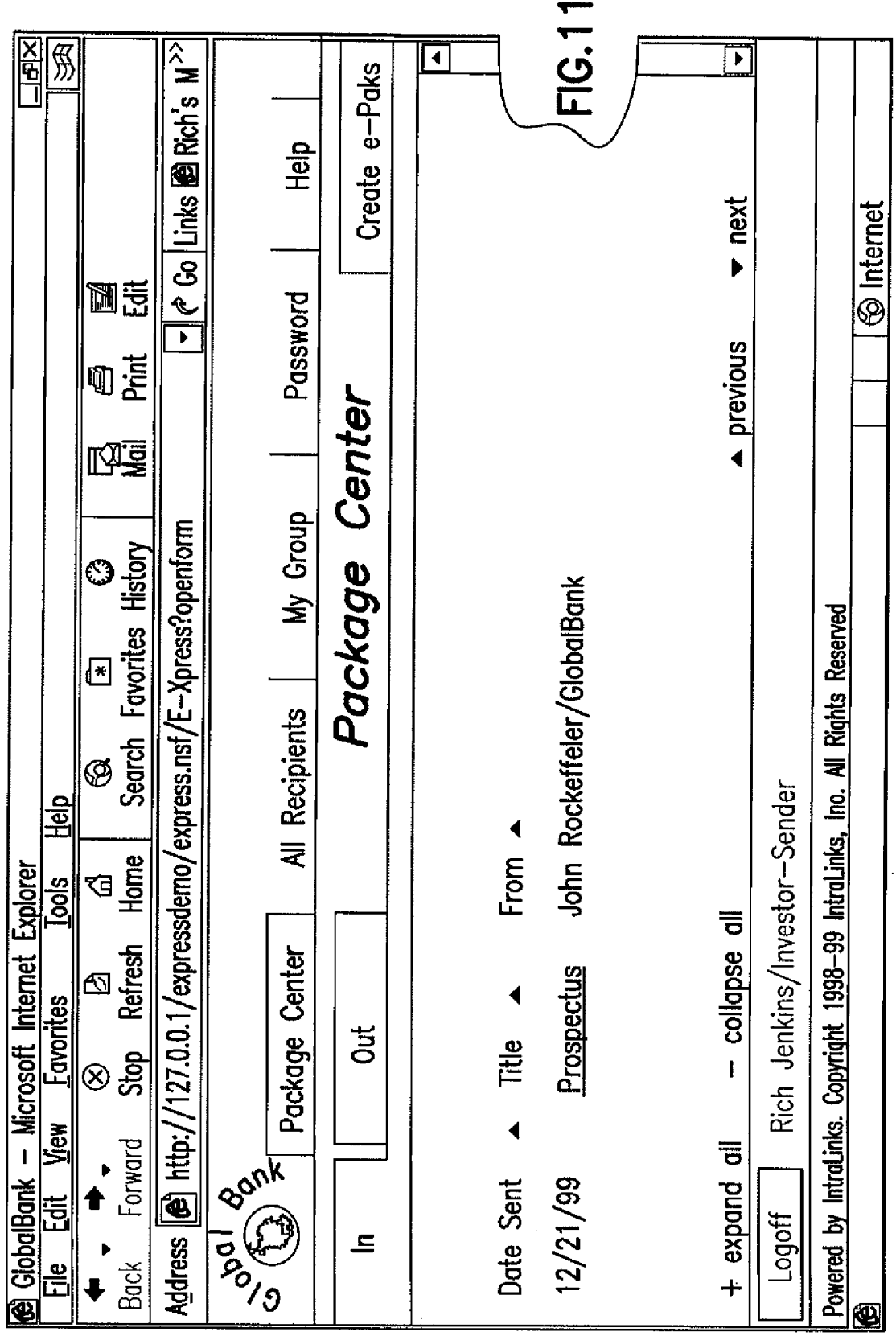
Figure 12:
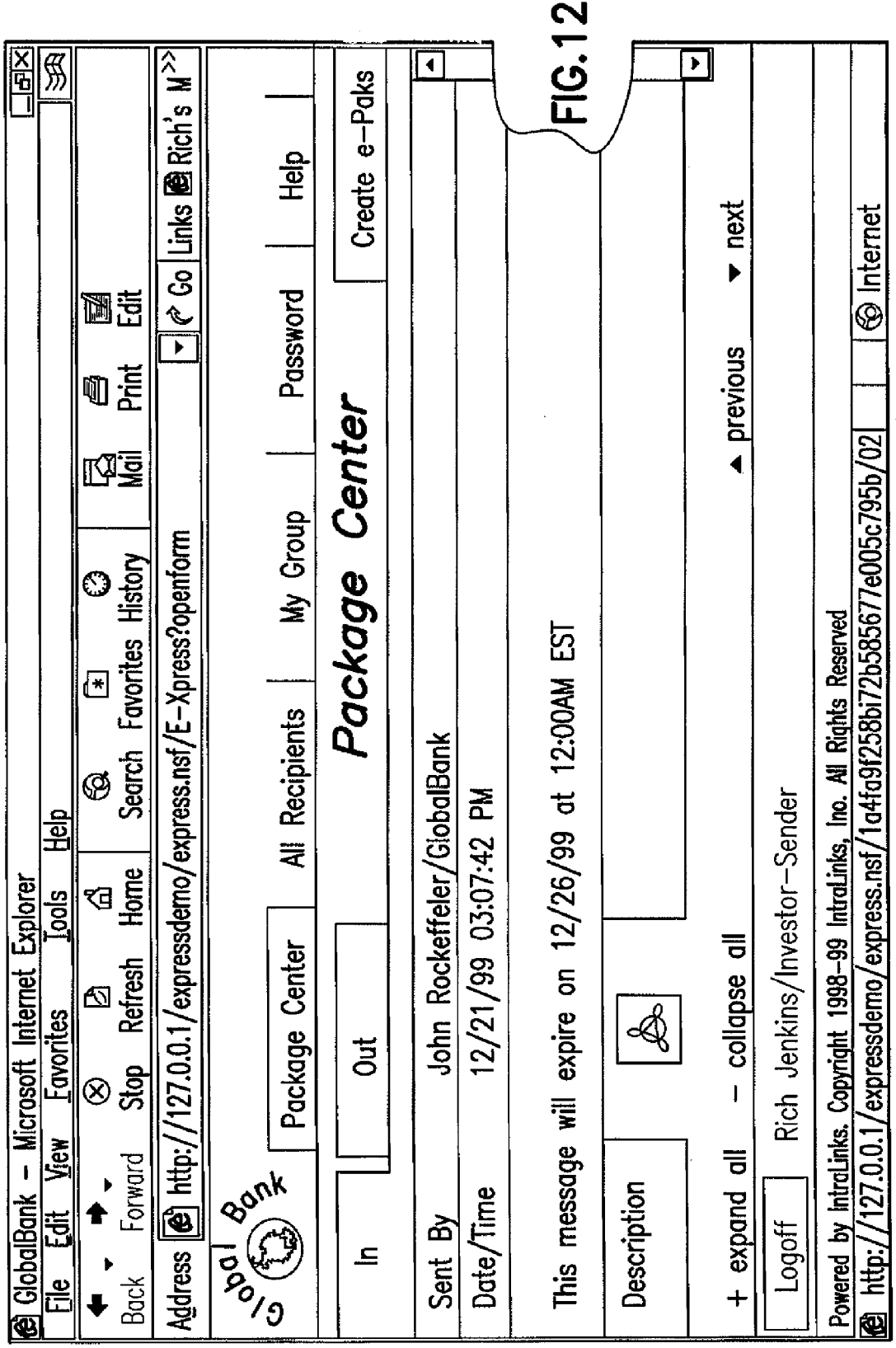
Figure 13:
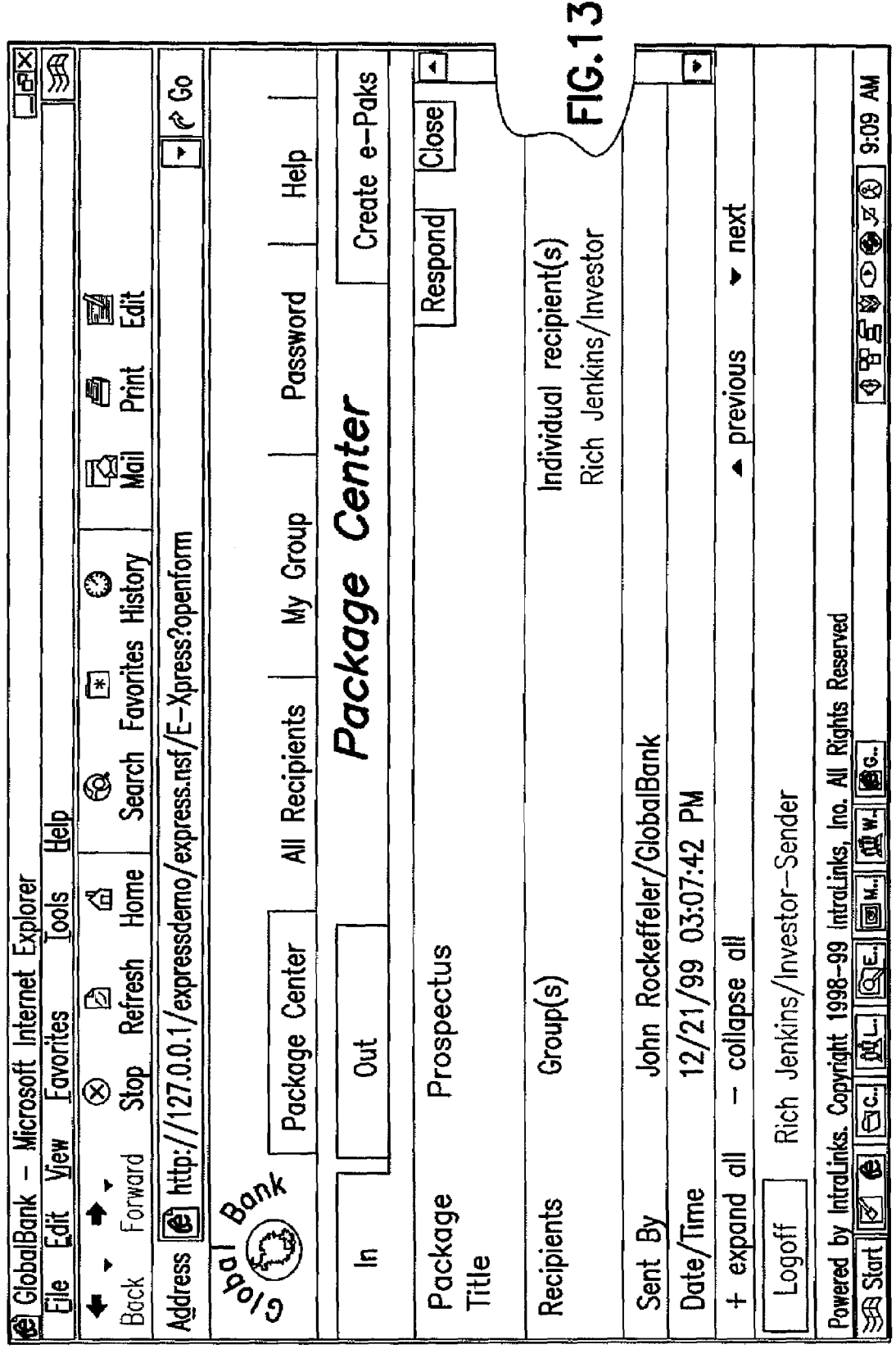
Figure 15:
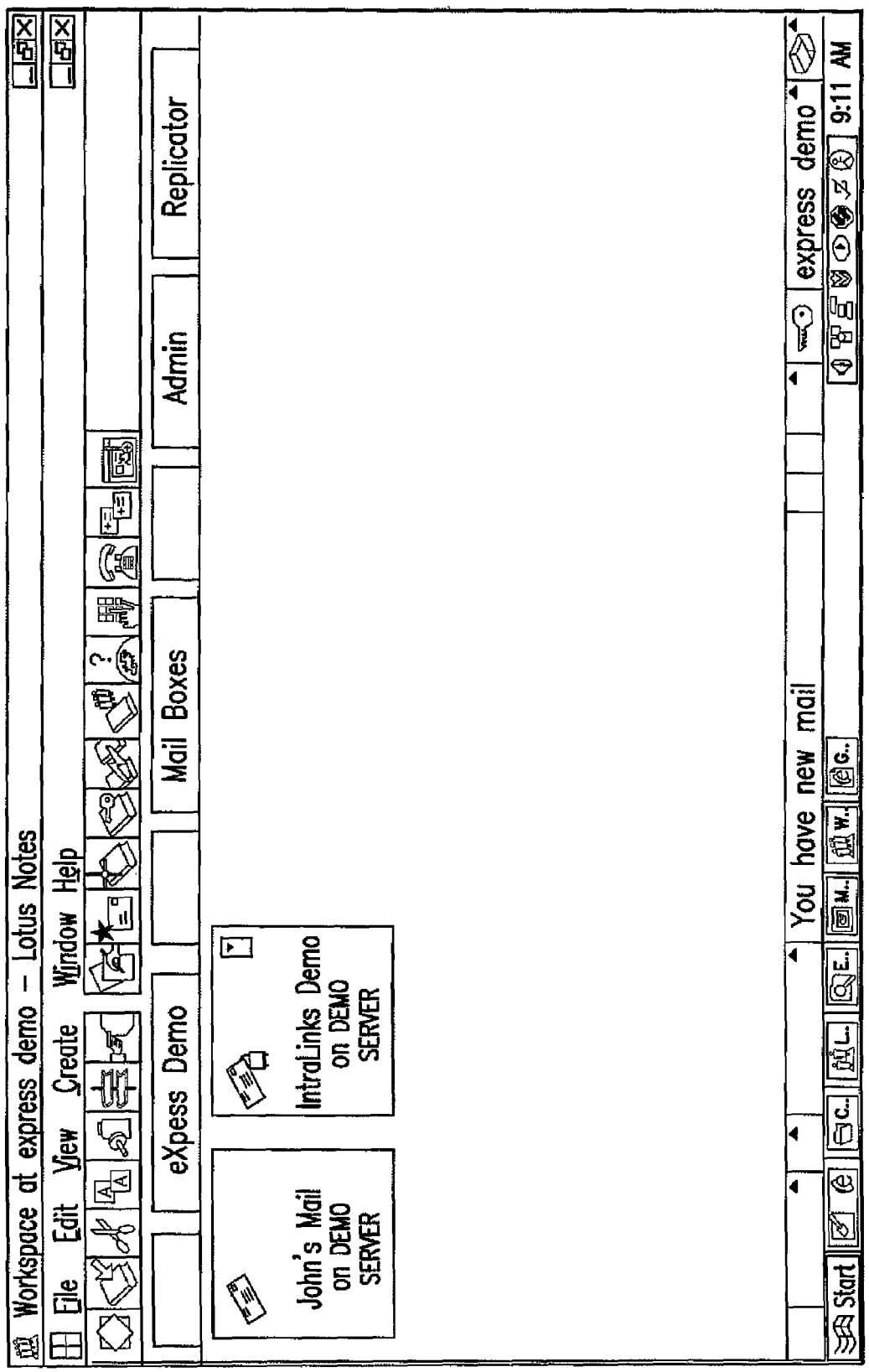
Figure 16:
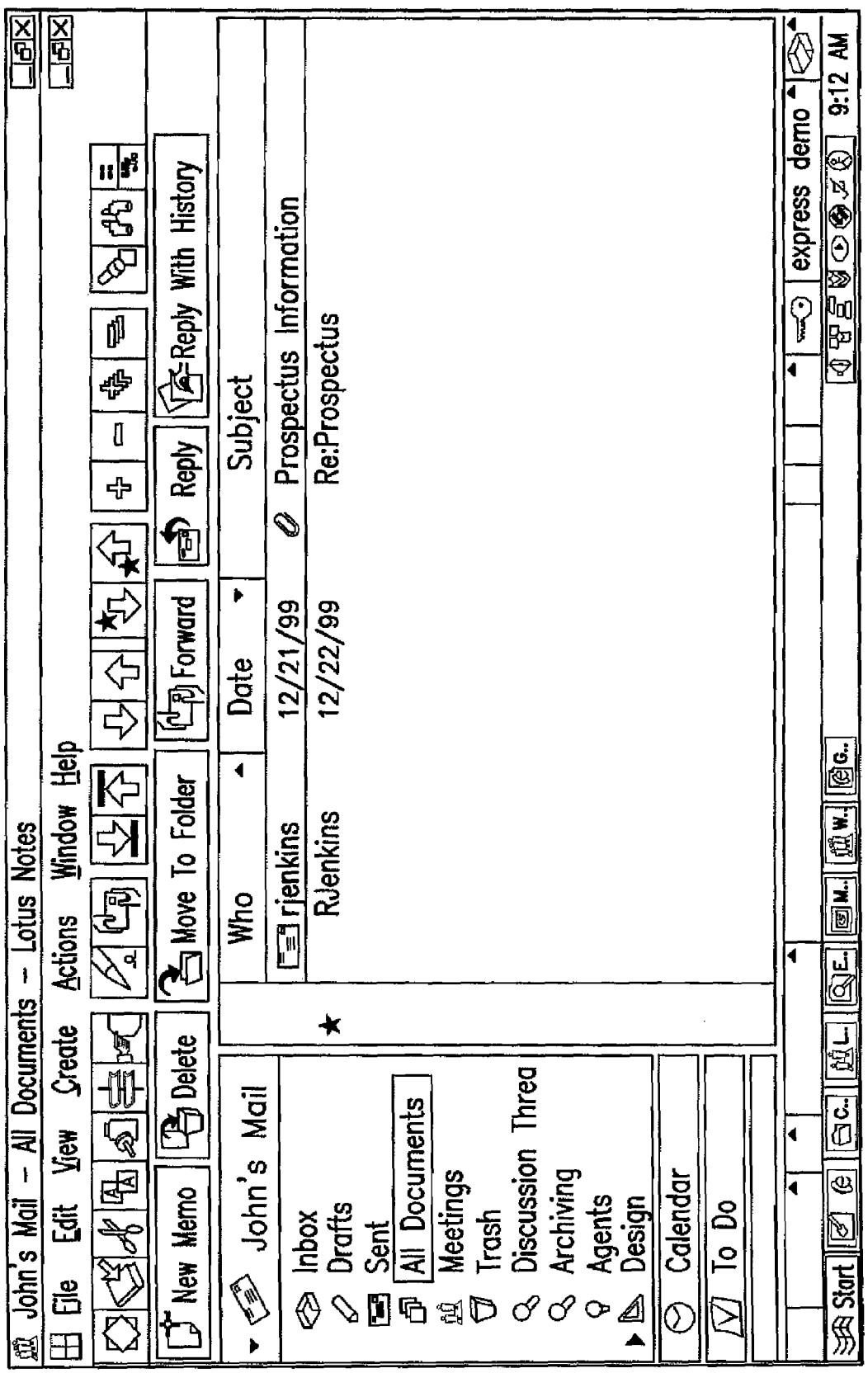
Figure 17:
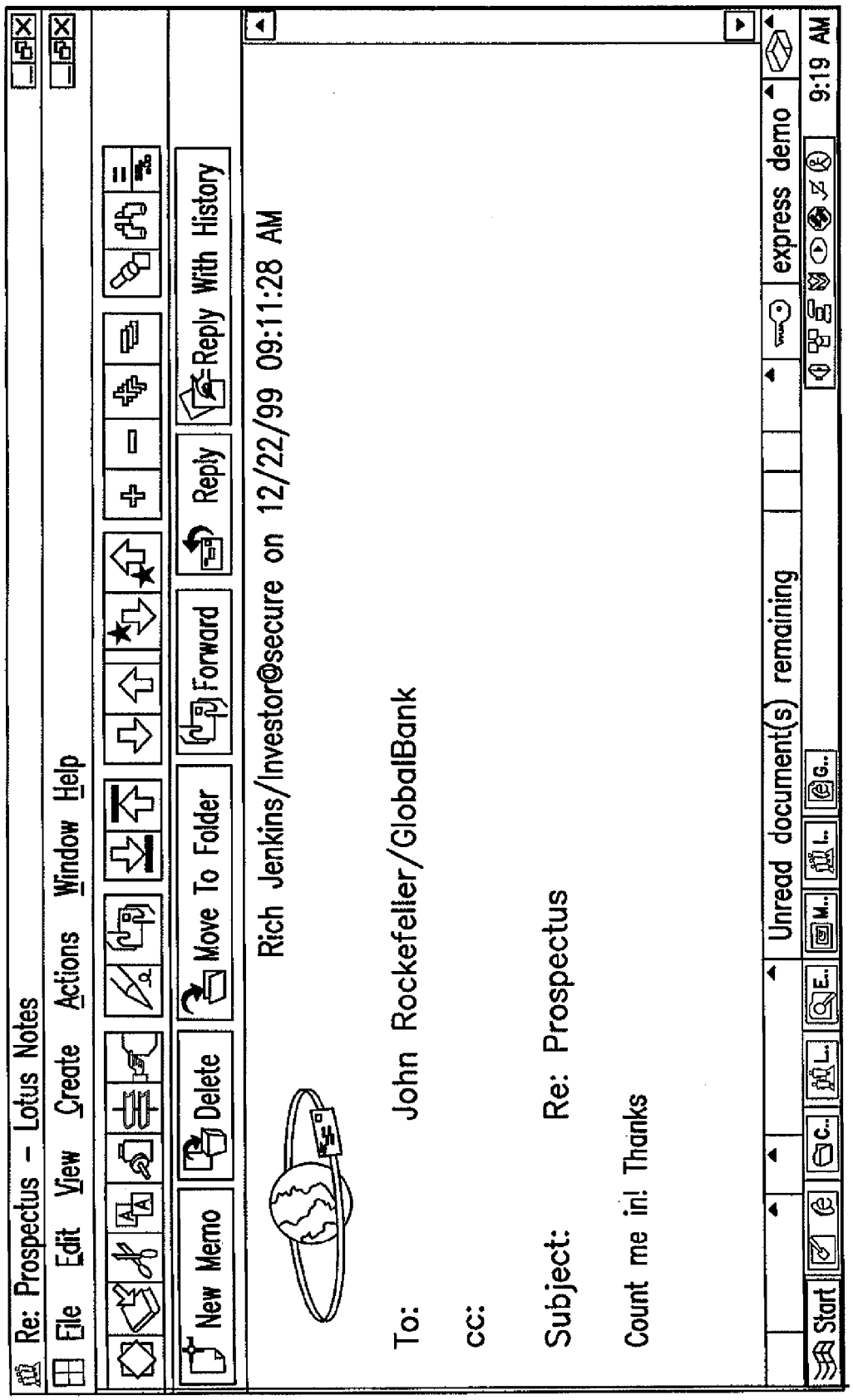

The user completes the e-mail form and clicks on send. The next screen, FIG. 6, is just showing that that document is now retained at the user's request if they decide to save it also in their sent box. So, it is just like the normal e-mail. The next screen, FIG. 7, is just Rich Jenkins as the recipient of e-mail looking at his inbox. Now Rich doesn't use Notes mail but uses a web mail solution. It doesn't matter because when Rich opens up his mailbox, the first thing that he would have received when he first got enabled to the service would be a welcome document which has his user id in it and another document which has his password in it. FIG. 8 adds an additional document which is a notification to Rich that he has a document to go pick up at the secure server. When Rich clicks on that notification message, it opens to a customizable notification that says he has a delivery at a URL, FIG. 9. Click on the URL and go pick it up. When Rick clicks on the URL, he sees FIG. 10 and gets prompted with an authentication box that allows you to authenticate with the secure site. The next screen, FIG. 11, is Rich's inbox and the service showing the document that was sent to him by John Rockefeller from John's Lotus Notes mail box. Rich could then click on that document which opens the document as shown in FIG. 12 allowing Rich to do all the normal functions such as detach the attachments and print it. FIG. 13 just shows that there's a respond button and a close button on the right hand side there so that Rich can click on the respond button in FIG. 13 and it would bring up the dialog box of FIG. 14. Rich can fill out this form, add some attachments, comments, whatever, and click the send button and that message would then get processed back through the secure server. And now we see what John gets on the other end, FIG. 15. So we're back to John's Notes desktop. John gets a message saying "you have new mail". So again, we saw that John was able to originate a secure document from within his Notes mailbox and a response to that document from someone using a browser found its way back through the secure service into John's native Notes mail environment. When John clicks on his icon again in FIG. 15, he opens FIG. 16, sees that there is a new document from Rich Jenkins, clicks on that document to see the document, FIG. 17. To reiterate, when Rich hits the send button, it gets sent using SSL browser encryption right into the secure service and from there it is encrypted all the way back to John Rockefeller's company, Global Bank, and gets routed through Global Bank's intranet, right to John Rockefeller's e-mail box. The only things that goes in clear text is the notification of FIG. 8. Everything else, sending documents, sending responses to those documents, is all sent encrypted. When John initially sent this document to Rich, what Rich got was a notification that says go to this website and you can get this document. When the response came back, it just came back as an e-mail directly to John. From the moment the message left Rich's desktop, to the moment it arrived on John's, that response was totally encrypted and was processed through the secure service. The only thing that went normal Internet e-mail path, or the only thing that goes normal Internet e-mail path is the notification messages. The response is not a notification message so it follows the secure path. The system takes the message that Rich saves and places it on the secure server. The server takes that document, instead of just sending out a notification, converts it and makes sure it follows the right secure path back into John's Notes mail infrastraucture. If Rich gets the document and wants to make some changes in the document, and then sends the document back to John, Rich would have to open the document, click on the attachment, detach it, make some changes to it and save a new version onto the hard drive. In order to return the secure document to John, Rich goes to the secure server, opens the original document, hits the respond button, fills out some comments, adds the new attachment and hits the send button. That document is going to then travel through the secure service to John's e-mail server. So what John would get, regarding this whole transaction is his original outbound message and now he has a new inbound message showing up right in his inbox. There are two different things happening. The first time mail was sent, the document goes to the secure server which notifies Rich that he has a document there. But when Rich responds, it appears that the document no longer goes to that secure site, but that it now goes directly back to John. Actually, the document goes to both the secure server and to John. When Rich is posting it to the secure site, the server processes the document to make sure it gets back into John's inbox. However, John could, if he wanted to, log into the site with his browser and can see that the document is there. So, it is now in both places.

Figure 18:
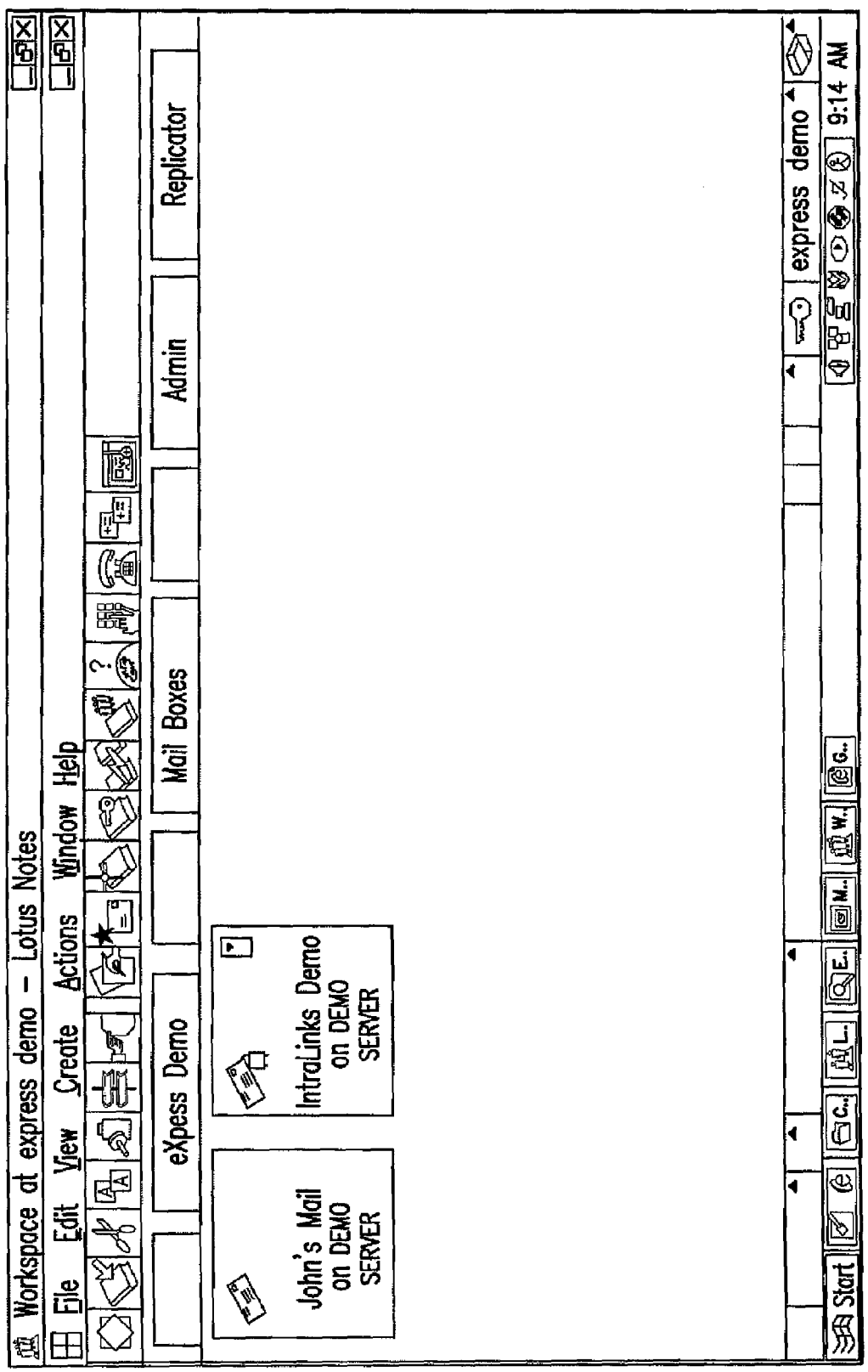

Referring to FIG. 18, there is another icon on John's desktop called IntraLinks Demo. If John double clicks on that icon, it would go to FIG. 19 which allows John to do three different things. Check the access log or, in other words, be able to go in and look at who has opened a document he has sent and who has not. Request new users that he can interact with or view all the users he currently can interact with. It will show the default view as access log will list all the documents that John has sent out that haven't expired yet and John could then just click on that first document, go to FIG. 20, open up that document and see who he sent it to, when he sent it, see the package access log, see who has opened it, who has not, and see the original attachment. All of this is done from within the Notes or other e-mail environment. John never has to use his browser to interact with the service if he doesn't want to. But everything that John is experiencing here in Notes, he could also do with his browser. All the people outside the enterprise, outside the Global Bank in this example, will use their browser.

Figure 19:
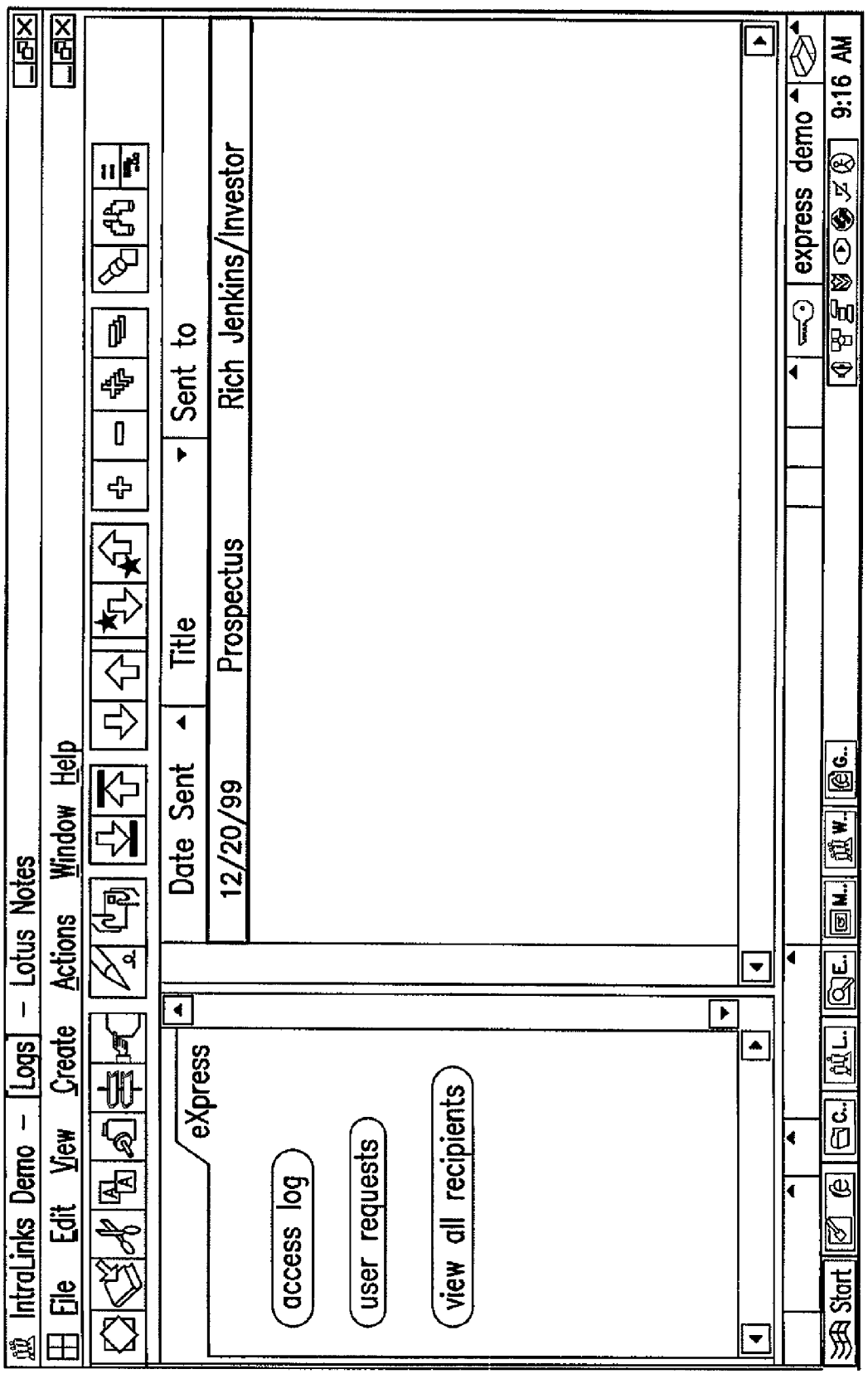
Figure 20:
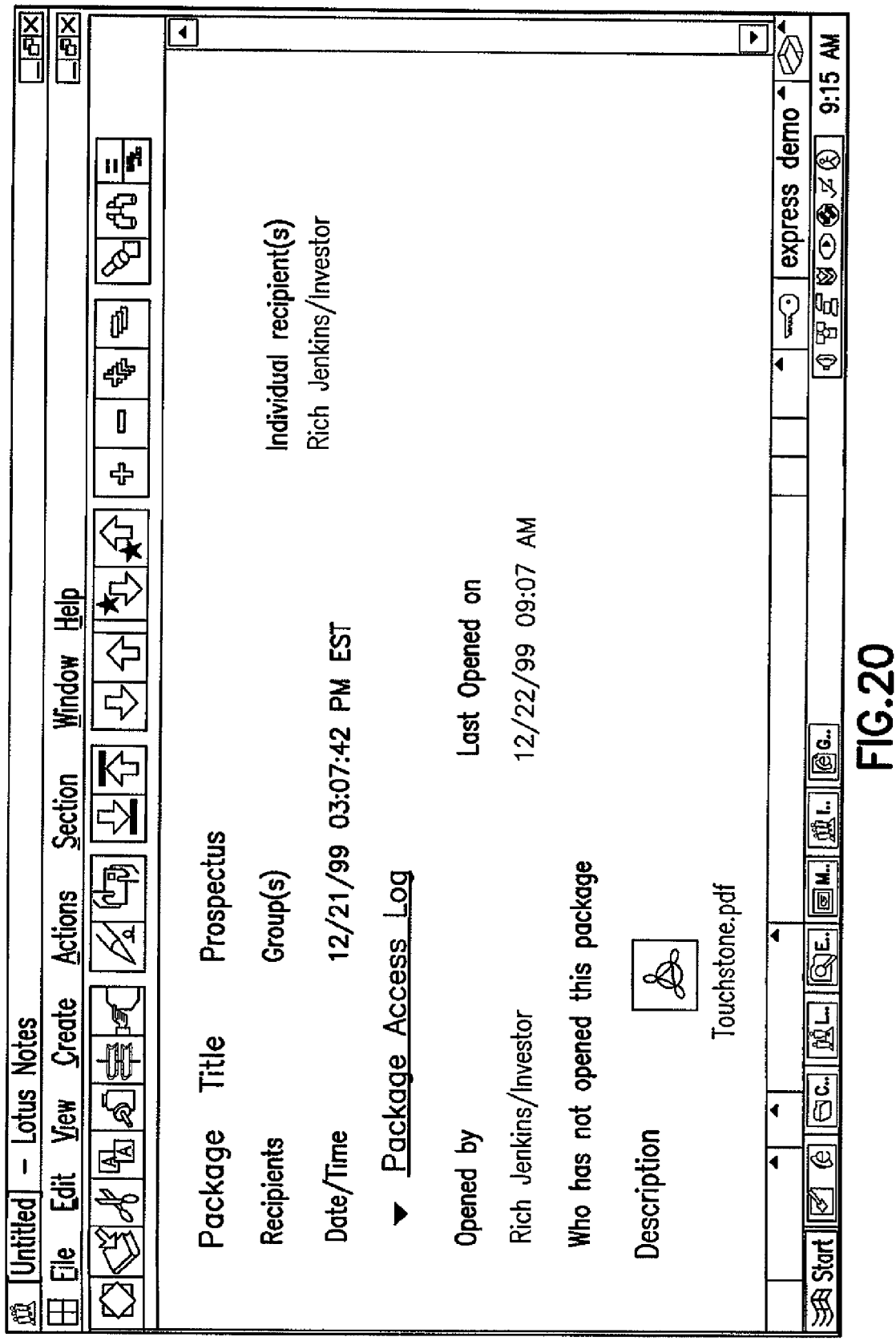
Figure 21:
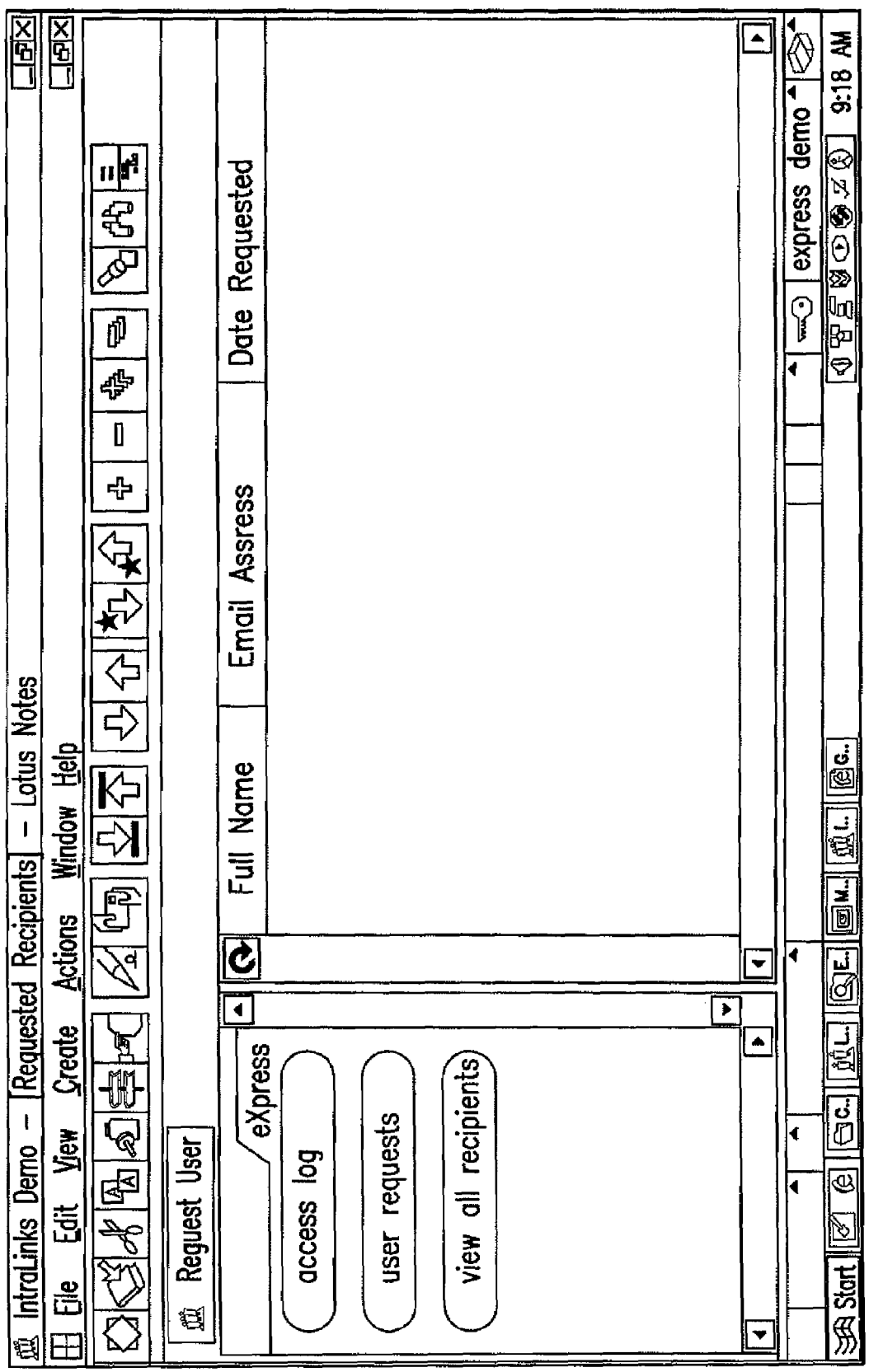
Figure 23:
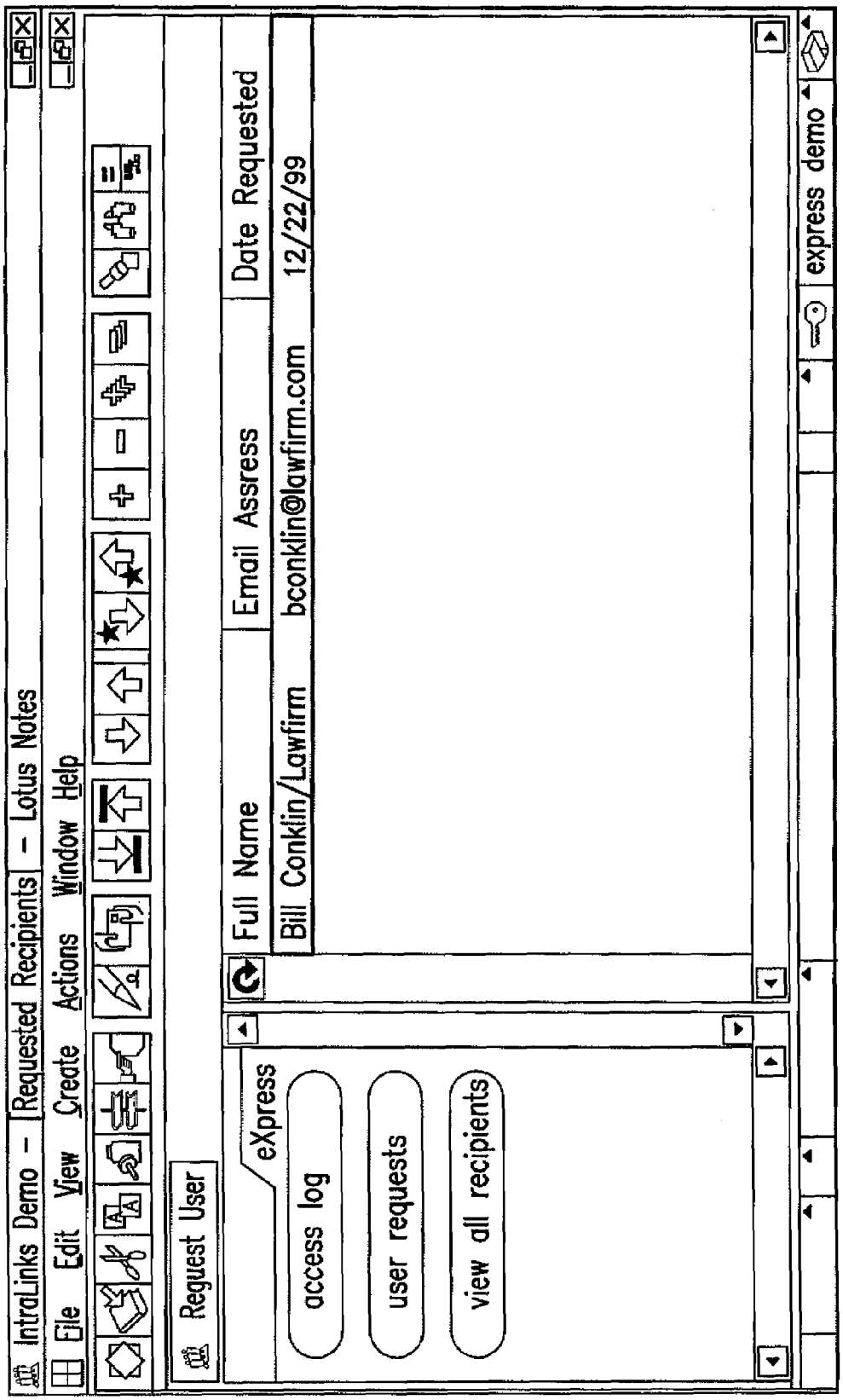
Figure 24:
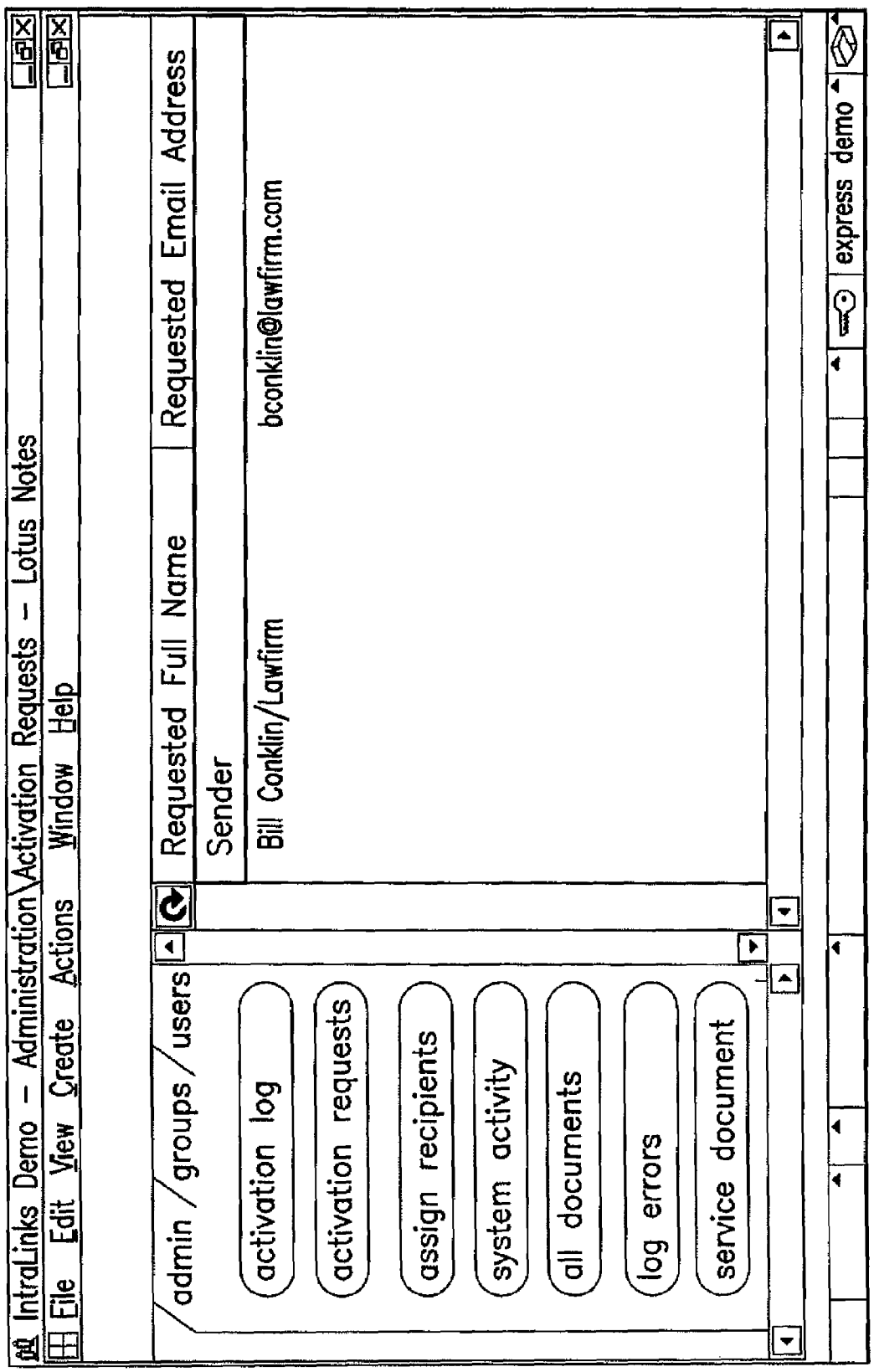
Figure 25:
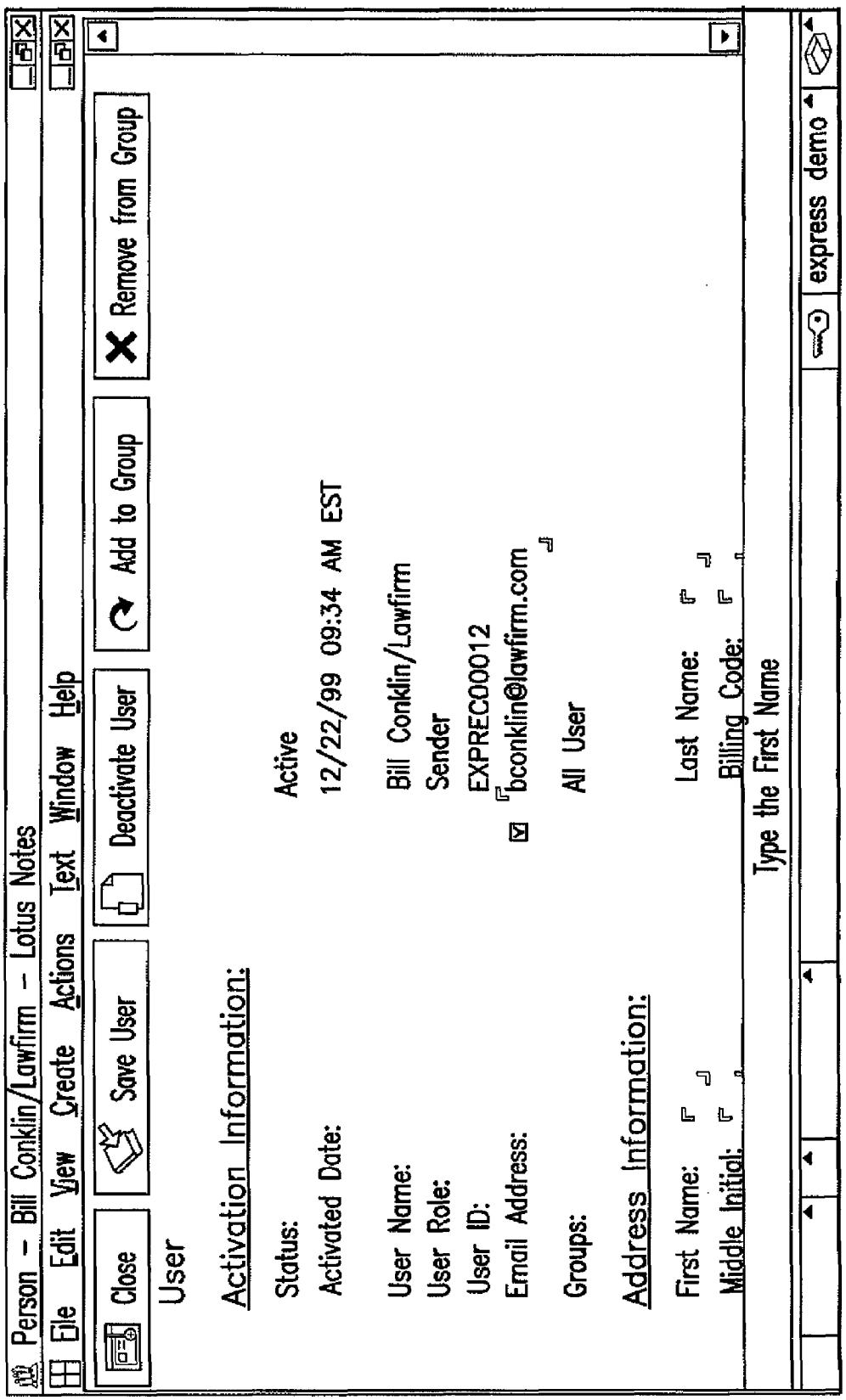
Figure 26:
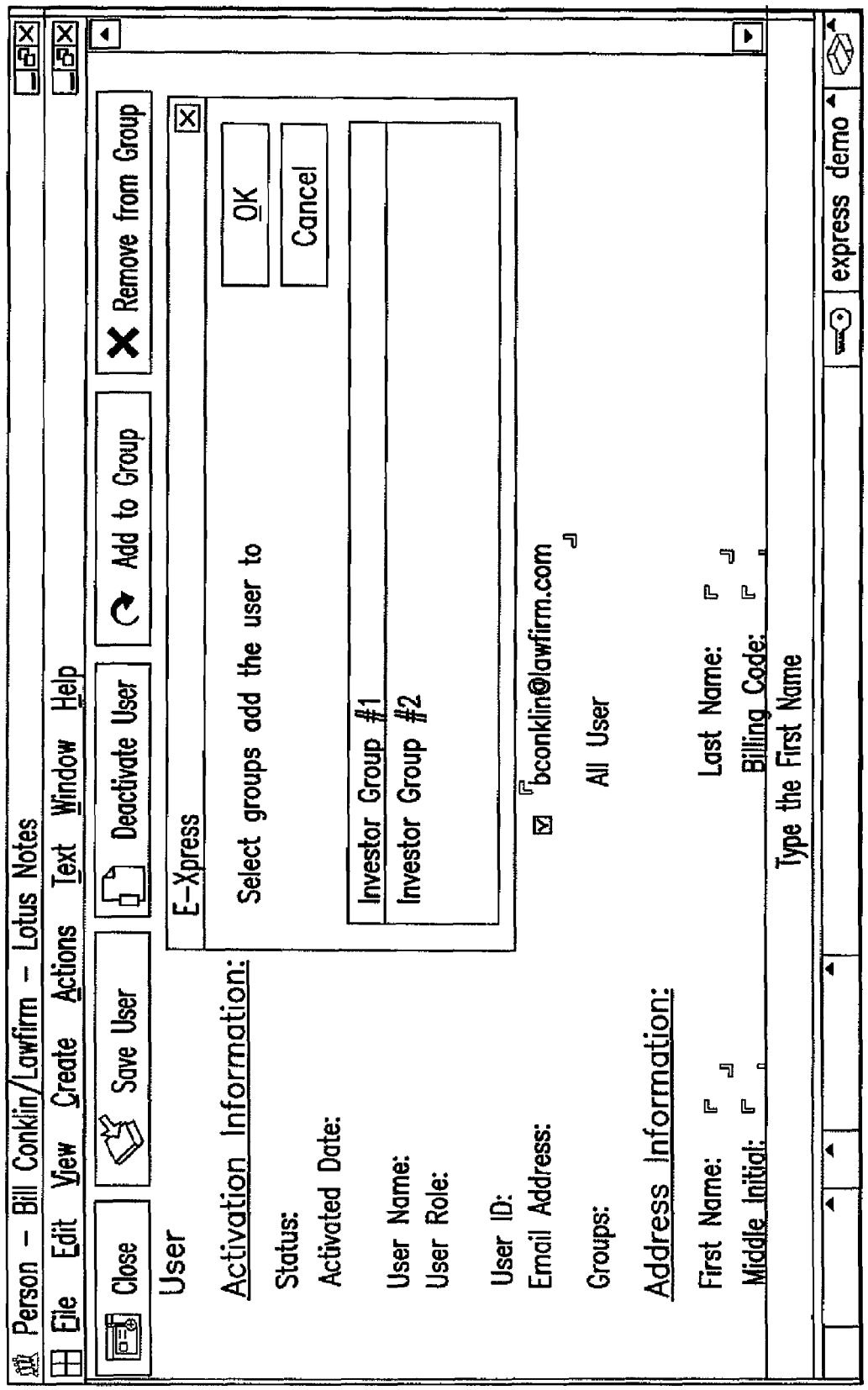
Figure 28:
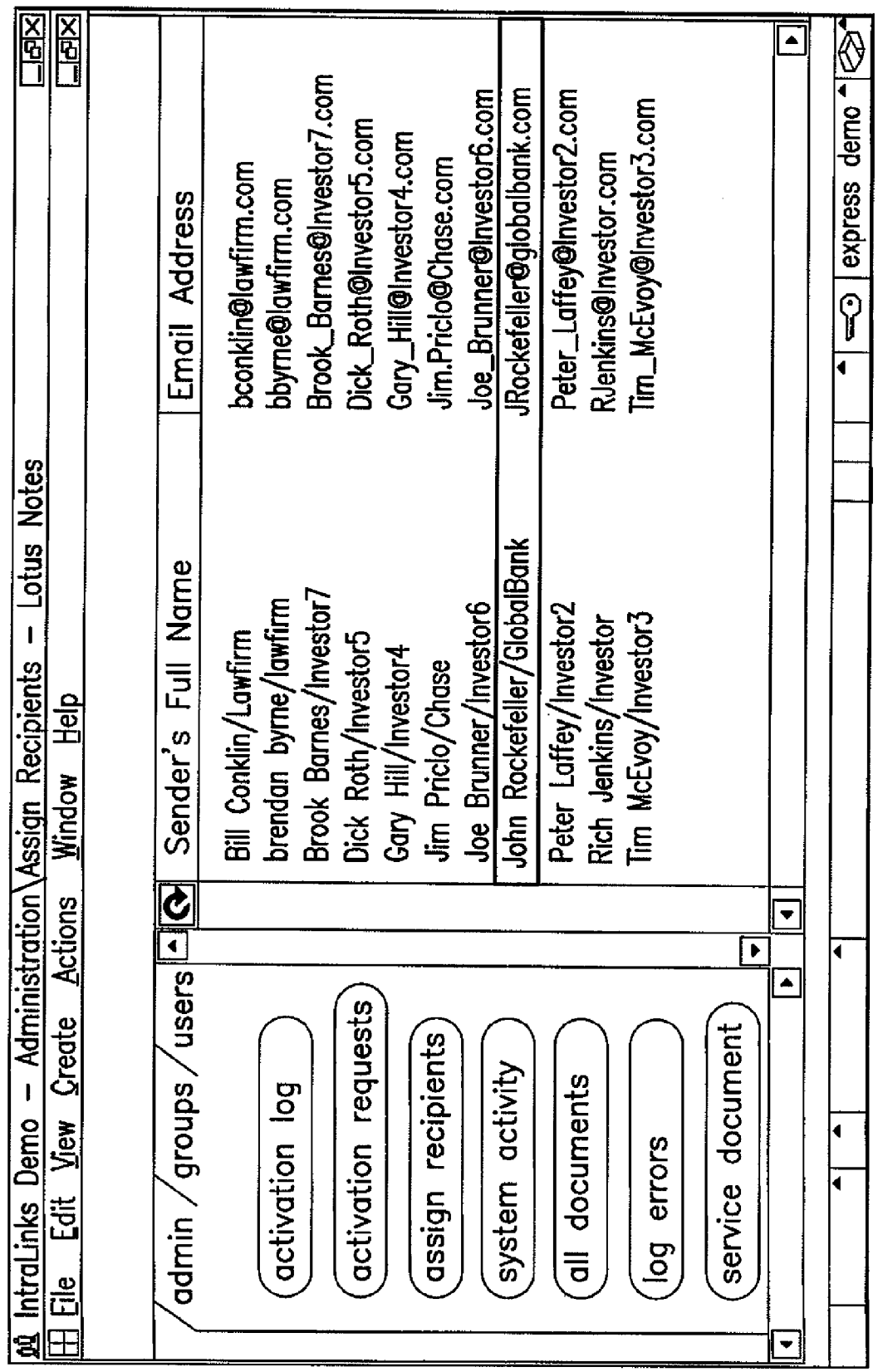
Figure 29:
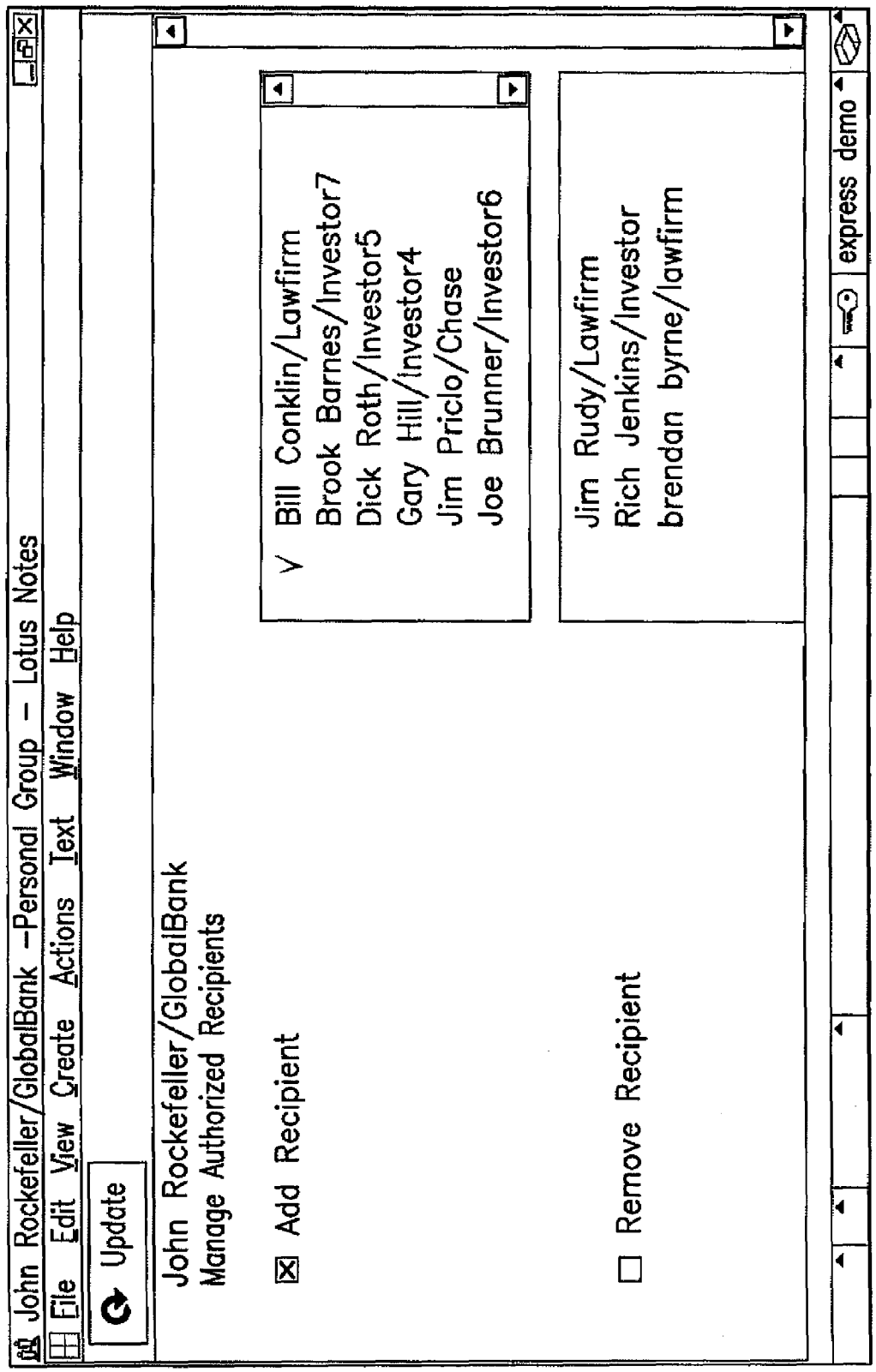
Figure 30:
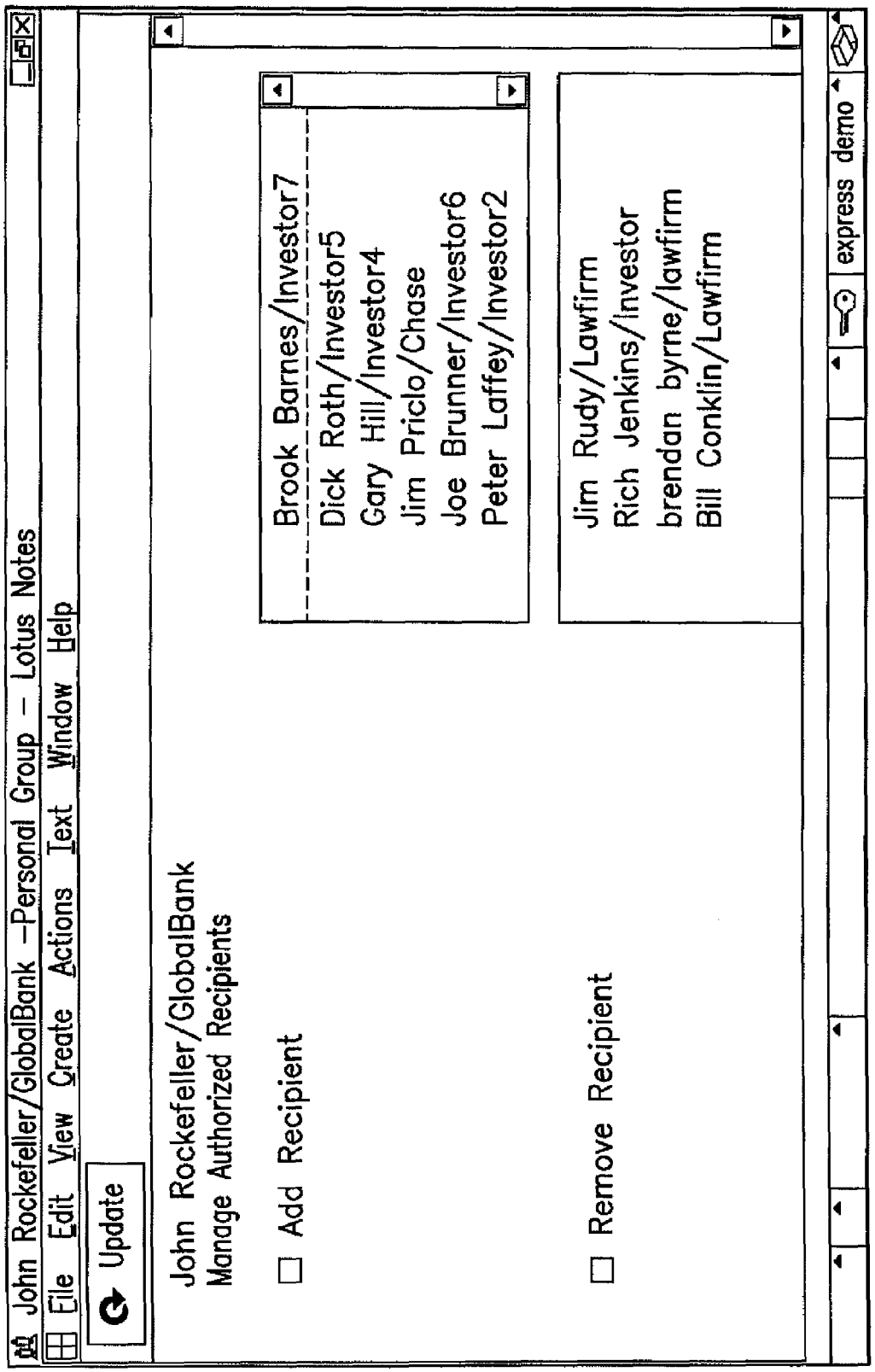
Figure 31:
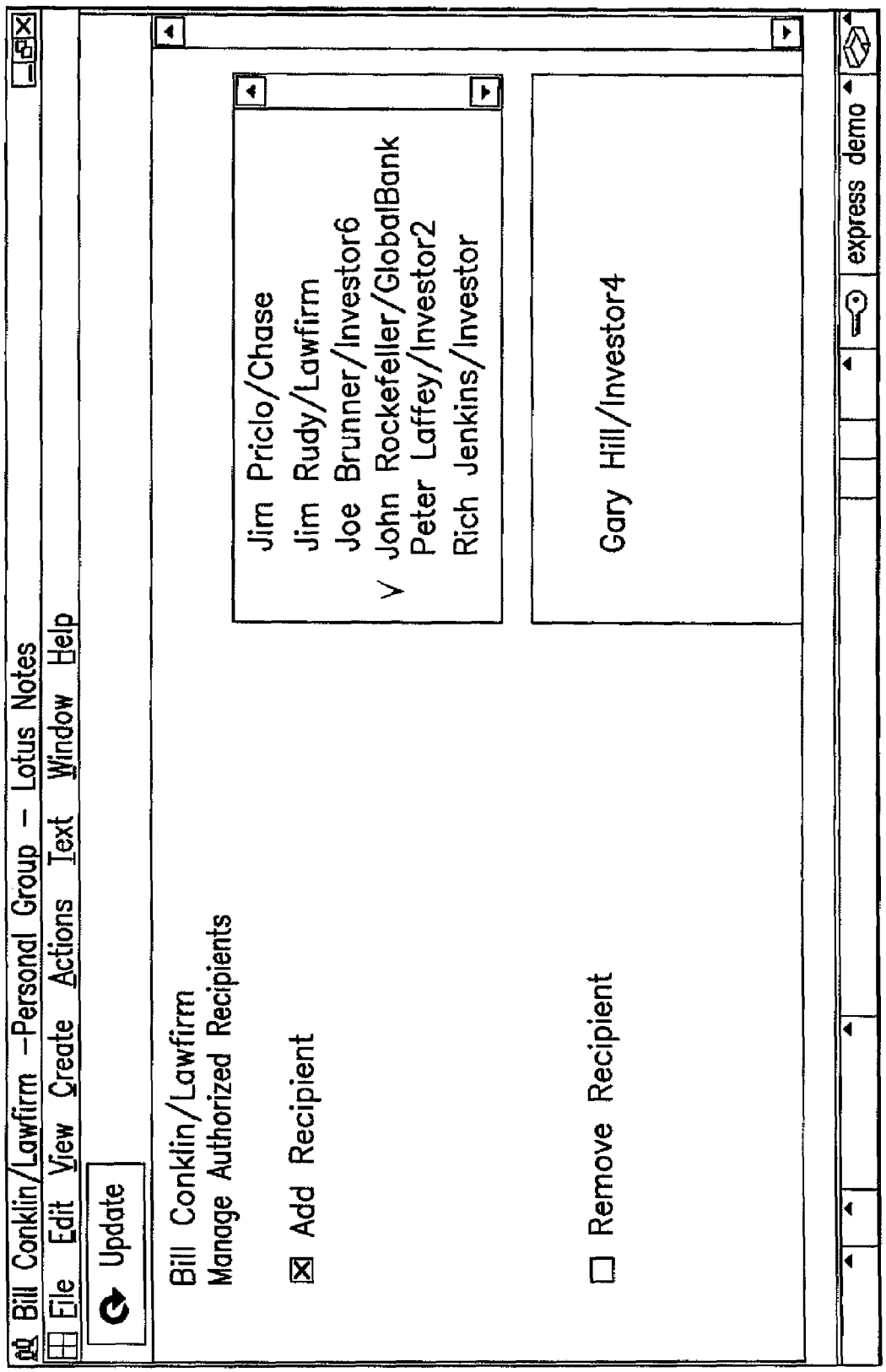
Figure 32:
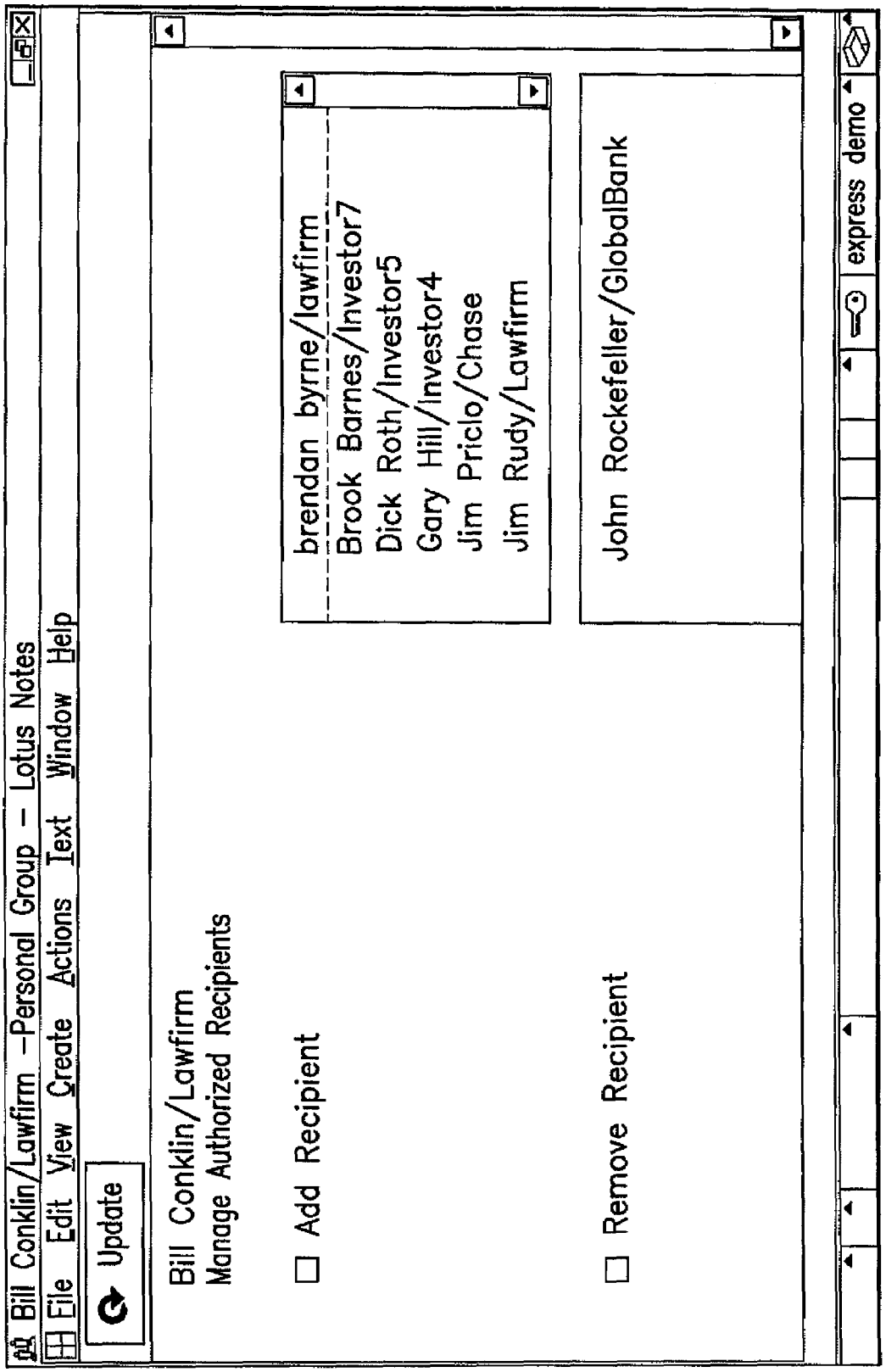

Back in FIG. 19, if you click on "user request", it brings you to FIG. 21. Since there are no pending user requests, the screen is blank. If you wanted to request a new user, click on the "request user" button to open FIG. 22 which allows addition of users. Once a request is made, it resides in the system for an administrator to process. The administrator would see FIG. 23 request Bill Conklin. The administrator could click on Bill's name, go to FIG. 24, see what was requested, make any necessary editing changes, and then click the activate user button. In FIG. 25, the person is now listed as active and is assigned a user id number. They could then add this person to a group by clicking the add to group button, which would bring them to FIG. 26. FIG. 27 comes up when "activation log" is checked in FIG. 24 to see who was activated, when they were activated and processed through the server 24 for access. FIG. 28 is a list of assigned recipients which shows how to allow people to send documents between each other. When you bring a user on the system, three things have to happen. You have to register a user, and make the user known to the system, but at that point, they can't talk to anybody and nobody can talk to them. Now the user must be assigned. If one double clicks on John Rockefeller in FIG. 28, FIG. 29 appears. The top box lists all of the people in the system that John is not yet assigned to and in the bottom left would be those people who John is assigned to. To assign someone, check off the person in the top box, check off add recipient, click the update button and you get FIG. 30 showing Bill Conklin in the authorized block of recipients that John can see. You then go through the same thing in reverse for Bill, FIG. 31. Bring up Bill's profile, check off John Rockefeller and recipient, click the update button and now brings you to FIG. 32. Bill can now see John and they can send things to each other. FIG. 33 is a system activity slide in Notes which shows the first time people have logged in and the last time they logged in. So the intent here is to allow the sponsor organization of the service to stay within their native environment, Lotus Notes or other groupware, and be able to send and receive secure documents from outside the organization.

The function described in the illustrative Notes environment will be recognized as transferable to other groupware systems. Further, the implementation of the invention using conventional e-mail and Internet browser systems will be apparent from the description. However, for purposes of a complete description, reference is also made to the e-Xpress User Manual, Version 1.0, attached hereto as an Appendix, the disclosure of which is hereby incorporated by reference.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

The invention claimed is:

1. A method for interchanging documents between a sender computer associated with a sending party, a server, and a plurality of receiver computers, each associated with a respective receiving party and each including a display mechanism for displaying a user interface to a respective receiving party, comprising:

storing one of the documents in a sender computer storage means;

uploading the document stored in the sender computer storage means into a server storage means as an uploaded document, wherein the uploading of the document from the sender computer storage means is carried out via encrypted data transmission;

selecting one or more of the receiving parties as recipients to which a given document is to be sent;

issuing a respective notification message from the server to the one or more receiver computers associated respectively with one or more selected recipients, each notification message indicating that the uploaded document is available in the server storage means;

downloading the uploaded document from the server storage means into a respective one of a plurality of receiver computer storage means associated with each of the receiver computers upon the issuance by a respective receiver computer of a download command signal to the server, wherein the downloading of the document from the server storage means is carried out via encrypted data transmission; and transmitting a response message from the receiver computer associated with a given one of the recipients including at least one of: (i) a response to the document downloaded to a respective receiver computer storage means; (ii) an edited version of the document downloaded to a respective receiver computer storage means; and (iii) a new document from a respective receiver computer storage means, wherein the response message is transmitted from a respective receiver computer storage means of a respective receiver computer to the sender computer storage means of the sender computer via the server storage means of the server, and wherein the response message is transmitted via an encrypted data transmission;

wherein each notification message is customized based on a respective selected recipient and the customization of each notification message includes a mechanism for retrieving a customized user interface for each selected recipient for downloading the uploaded document.

2. The method of claim 1, wherein the step of issuing the respective notification message further comprises issuing the respective notification message via email.

3. The method of claim 1, wherein the step of uploading the document stored in the sender computer storage means further comprises uploading the document at predetermined time intervals.

4. The method of claim 1, wherein the respective notification message includes data indicative of new documents uploaded into the server storage means from the sender computer storage means since the issuance of a previous respective notification message.

5. The method of claim 1, wherein the step of issuing the respective notification message further comprises issuing a respective message report to at least one of the sending party and a manager of the server, wherein the respective message report includes data indicative of whether a document has been downloaded by a given recipient.

6. The method of claim 1, wherein at least one of the steps of: a) selecting one or more of the receiving parties as recipients; b) uploading the document stored in the sender computer storage means into the server storage means; c) issuing a respective notification message from the server to the selected recipients; d) downloading the document from the server storage means into the receiver computer storage means associated with respective ones of each of the recipients; and e) transmitting a response message from the receiver computer storage means associated with a given one of the recipients to the sender computer storage means is carried out via a communications network.

7. The method of claim 6, wherein the communications network is a global communications network.

8. The method of claim 1, wherein at least one of: (a) the interchanged documents; and (b) the response transmitted from the receiver computer storage means associated with a given one of the recipients to the sender computer storage means is in the form of a computer file.

9. The method of claim 8, wherein the computer file includes one of at least text data, binary data, still image data, moving image data, and audio data.

10. The method of claim 1, wherein the sender computer storage means is local relative to the sender computer, the server storage means is local relative to the server, and the receiver computer storage means associated with a given one of the recipients is local relative to the receiver computer associated with a given one of the recipients.

11. The method of claim 1, wherein the step of uploading the document from the sender computer storage means further comprises authenticating an identity of the sender computer and an identity of the server.

12. The method of claim 1, wherein the step of downloading the document to the receiver computer storage means associated with a given one of the recipients further comprises authenticating an identity of the receiver computer associated with a given one of the recipients and an identity of the server.

13. The method of claim 1, wherein the step of transmitting a response message from the receiver computer associated with a given one of the recipients to the sender computer via the server further comprises authenticating an identity of the receiver computer associated with a given one of the recipients, an identity of the server, and an identity of the sender computer.

14. The method of claim 1, wherein the step of selecting one or more of the receiving parties as recipients further comprises associating an email address with each of the recipients.

15. The method of claim 14, wherein the step of associating an email address with each of the recipients further comprises adding a security designation to each email address of each recipient.

16. A system for interchanging documents between a sender computer associated with a sending party, a server, and a plurality of receiver computers, each associated with a respective receiving party and each including a display mechanism for displaying a user interface to a respective receiving party, comprising:

sender computer storage means for storing one of the documents;

uploading means for uploading the document stored in the sender computer storage means into a server storage means as an uploaded document, wherein the uploading of the document from the sender computer storage means is carried out via encrypted data transmission;

selecting means for selecting one or more of the receiving parties as recipients to which a given document is to be sent;

notification message issuing means for issuing a respective notification message from the server to the one or more receiver computers associated respectively with one or more selected recipients, each notification message indicating that the uploaded document is available in the server storage means;

downloading means for downloading the uploaded document from the server storage means into a respective one of a plurality of receiver computer storage means associated with each of the receiver computers upon the issuance by a respective receiver computer of a download command signal to the server, wherein the downloading of the document from the server storage means is carried out via encrypted data transmission; and transmitting means for transmitting a response message from the receiver computer associated with a given one of the recipients including at least one of: (i) a response to the document downloaded to a respective receiver computer storage means; (ii) an edited version of the document downloaded to a respective receiver computer storage means; and (iii) a new document from the receiver computer storage means, wherein the response message is transmitted from a respective receiver computer storage means of a respective receiver computer to the sender computer storage means of the sender computer via the server storage means of the server, and wherein the response message is transmitted via an encrypted data transmission; and wherein each notification message is customized based on a respective selected recipient and the customization of each notification message includes a mechanism for retrieving a customized user interface for each selected recipient for downloading the uploaded document.

17. The system of claim 16, wherein the notification message issuing means further comprises means for issuing the respective notification message via email.

18. The system of claim 16, wherein the uploading means for uploading the document stored in the sender computer storage means further comprises means for uploading the document at predetermined time intervals.

19. The system of claim 16, wherein the respective notification message includes data indicative of new documents uploaded into the server storage means from the sender computer storage means since the issuance of a previous respective notification message.

20. The system of claim 16, wherein the notification message issuing means further comprises means for issuing a respective message report to at least one of the sending party and a manager of the server, wherein the respective message report includes data indicative of whether a document has been downloaded by a given recipient.

21. The system of claim 16, wherein at least one of: (a) the interchanged documents; and (b) the response transmitted from the receiver computer storage means associated with a given one of the recipients to the sender computer storage means is in the form of a computer file.

22. The system of claim 21, wherein the computer file includes one of at least text data, binary data, still image data, moving image data, and audio data.

23. The system of claim 16, wherein the sender computer storage means is local relative to the sender computer, the server storage means is local relative to the server, and the receiver computer storage means associated with a given one of the recipients is local relative to the receiver computer associated with a given one of the recipients.

24. The system of claim 16, wherein the uploading means for uploading the document from the sender computer storage means further comprises means for authenticating an identity of the sender computer and an identity of the server.

25. The system of claim 16, wherein the downloading means for downloading the document to the receiver computer storage means associated with a given one of the recipients further comprises means for authenticating an identity of the receiver computer associated with a given one of the recipients and an identity of the server.

26. The system of claim 16, wherein the transmitting means for transmitting a response message from the receiver computer associated with a given one of the recipients to the sender computer via the server further comprises means for authenticating an identity of the receiver computer associated with a given one of the recipients, an identity of the server, and an identity of the sender computer.

27. The system of claim 16, wherein the selecting means for selecting one or more of the receiving parties as recipients further comprises means for associating an email address with each of the recipients.

28. The system of claim 27, wherein the means for associating an email address with each of the recipients further comprises means for adding a security designation to each email address of each recipient.

29. The system of claim 16, wherein the uploading means further comprises a sender client software program associated with the sender computer in communication with a server software program associated with the server.

30. The system of claim 29, wherein the sender client software program comprises a web browser and the server software program comprises a web server software program.

31. The system of claim 16, wherein the downloading means and the transmitting means further comprise a receiver client software program associated with the receiver computer associated with a given one of the recipients in communication with a server software program associated with the server.

32. The system of claim 31, wherein the receiver client software program comprises a web browser and the server software program comprises a web server software program.

33. The system of claim 16, wherein the sender computer has installed thereon a client groupware software program, wherein the sender computer is connected to an intranet, wherein the intranet includes an intranet server, wherein the intranet server has installed thereon a server groupware software program for communicating with the client groupware software program, and wherein the sender computer communicates with the server via the intranet server.

34. The system of claim 33, wherein the client groupware software program is a Lotus Notes software program and wherein the server groupware software program is a Lotus Domino software program.

35. A system for interchanging documents between a sender computer which is associated with a sending party and which includes a sender computer storage means, a server which includes a server storage means, and a plurality of receiver computers, each of which is associated with a receiving party, each of which includes a receiver computer storage means and each of which includes a display mechanism for displaying a user interface to a respective receiving party, comprising:

uploading means for uploading one of the documents stored in the sender computer storage means into the server storage means as an uploaded document, wherein the uploading of the document from the sender computer storage means is carried out via encrypted data transmission;

selecting means for selecting one or more of the receiving parties as recipients to which a given document is to be sent;

notification message issuing means for issuing a respective notification message from the server to one or more receiver computers associated respectively with one or more selected recipients, each notification message indicating that the uploaded document is available in the server storage means;

downloading means for downloading the uploaded document from the server storage means into a respective one of a plurality of receiver computer storage means associated with each of the receiver computers upon the issuance by a respective receiver computer of a download command signal to the server, wherein the downloading of the document from the server storage means is carried out via encrypted data transmission; and transmitting means for transmitting a response message from the receiver computer associated with a given one of the recipients including at least one of: (i) a response to the document downloaded to a respective receiver computer storage means; (ii) an edited version of the document downloaded to a respective receiver computer storage means; and (iii) a new document from a respective receiver computer storage means, wherein the response message is transmitted from a respective receiver computer storage means of a respective receiver computer to the sender computer storage means of the sender computer via the server storage means of the server, and wherein the response message is transmitted via an encrypted data transmission;

wherein each notification message is customized based on a respective selected recipient and the customization of each notification message includes a mechanism for retrieving a customized user interface for each selected recipient for downloading the uploaded document.

36. The method of claim 1, wherein the mechanism for retrieving from the server a customized user interface comprises an HTML email.

37. The method of claim 1, wherein the mechanism for retrieving from the server a customized user interface comprises a web browser link including a location of the uploaded document and instructions for generating the customized user interface for each selected recipient.

38. The method of claim 1, wherein the customized user interface for each selected recipient makes it appear that each selected recipient is connected to an internal client server distinct from the server from which the notification message was issued.

39. The method of claim 1, wherein the customized user interface for a first one of the selected recipients makes it appear that the first one of the selected recipients is connected to a first company server associated with a first company, wherein the customized user interface for a second one of the selected recipients makes it appear that the second one of the selected recipients is connected to a second company server associated with a second company, and wherein the first company and the second company are distinct from one another.

40. The system of claim 16, wherein the mechanism for retrieving from the server a customized user interface comprises an HTML email.

41. The system of claim 16, wherein the mechanism for retrieving from the server a customized user interface comprises a web browser link including a location of the uploaded document and instructions for generating the customized user interface for each selected recipient.

42. The system of claim 16, wherein the customized user interface for each selected recipient makes it appear that each selected recipient is connected to an internal client server distinct from the server from which the notification message was issued.

43. The system of claim 16, wherein the customized user interface for a first one of the selected recipients makes it appear that the first one of the selected recipients is connected to a first company server associated with a first company, wherein the customized user interface for a second one of the selected recipients makes it appear that the second one of the selected recipients is connected to a second company server associated with a second company, and wherein the first company and the second company are distinct from one another.

44. The system of claim 35, wherein the mechanism for retrieving from the server a customized user interface comprises an HTML email.

45. The system of claim 35, wherein the mechanism for retrieving from the server a customized user interface comprises a web browser link including a location of the uploaded document and instructions for generating the customized user interface for each selected recipient.

46. The system of claim 35, wherein the customized user interface for each selected recipient makes it appear that each selected recipient is connected to an internal client server distinct from the server from which the notification message was issued.

47. The system of claim 35, wherein the customized user interface for a first one of the selected recipients makes it appear that the first one of the selected recipients is connected to a first company server associated with a first company, wherein the customized user interface for a second one of the selected recipients makes it appear that the second one of the selected recipients is connected to a second company server associated with a second company, and wherein the first company and the second company are distinct from one another.

* * * * *

UNITED STATES PATENT AND TRADEMARK OFFICE
CERTIFICATE OF CORRECTION

| | | |
|---|---|---|
| PATENT NO. | : 7,233,992 B1 | Page 1 of 1 |
| APPLICATION NO. | : 09/483171 | |
| DATED | : June 19, 2007 | |
| INVENTOR(S) | : John M. Muldoon et al. | |

It is certified that error appears in the above-identified patent and that said Letters Patent is hereby corrected as shown below:

Title Page, Item "(73) Assignee:", delete "Comerica Bank-California, San Jose, CA (US)" and insert -- Intralinks, Inc., New York, NY (US) --, therefor.

Signed and Sealed this
Third Day of February, 2015

Michelle K. Lee
*Deputy Director of the United States Patent and Trademark Office*